United States Patent
Wu et al.

(10) Patent No.: US 10,863,459 B2
(45) Date of Patent: Dec. 8, 2020

(54) SYNCHRONIZATION SIGNALS AND CHANNEL STRUCTURE FOR NARROWBAND LTE DEPLOYMENTS

(71) Applicant: Apple Inc., Cupertino, CA (US)

(72) Inventors: Tao Wu, San Jose, CA (US); Debdeep Chatterjee, Mountain View, CA (US); Gang Xiong, Beaverton, OR (US); Mohammad Mamunur Rashid, Hillsboro, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/741,282

(22) PCT Filed: Dec. 23, 2015

(86) PCT No.: PCT/US2015/000254
§ 371 (c)(1),
(2) Date: Jan. 1, 2018

(87) PCT Pub. No.: WO2017/018966
PCT Pub. Date: Feb. 2, 2017

(65) Prior Publication Data
US 2018/0184390 A1    Jun. 28, 2018

Related U.S. Application Data

(60) Provisional application No. 62/196,530, filed on Jul. 24, 2015.

(51) Int. Cl.
*H04J 3/06* (2006.01)
*H04W 56/00* (2009.01)
(Continued)

(52) U.S. Cl.
CPC ..... *H04W 56/0005* (2013.01); *H04L 27/2613* (2013.01); *H04L 27/2692* (2013.01);
(Continued)

(58) Field of Classification Search
CPC .................................................. H04W 56/0005
See application file for complete search history.

(56) References Cited

U.S. PATENT DOCUMENTS 6,452,958 B1 *  9/2002  van Nee ........... H04J 13/00483
6,567,482 B1 *  5/2003  Popovic' .............. H04B 1/7093
                                                              375/343
(Continued)

FOREIGN PATENT DOCUMENTS

CN    103209060 A    7/2013
CN    103379082 A    10/2013
(Continued)

OTHER PUBLICATIONS

3GPP TR 45.820, "3rd Generation Partnership Project; Technical Specification Group GSM/EDGE Radio Access Network; Cellular System Support for Ultra Low Complexity and Low Throughput Internet of Things;", (Release 13) V1.4.0, Jul. 2015, 361 pages.
(Continued)

*Primary Examiner* — Guang W Li
(74) *Attorney, Agent, or Firm* — Stoel Rives LLP

(57) ABSTRACT

User equipment (UE) provides machine type communications (MTC) through a narrowband (NB)-long term evolution (LTE) system having a downlink transmission bandwidth in a range from about 180 kilohertz (kHz) to about 200 kHz. Receive circuitry is configured to receive, through a downlink transmission of an evolved node B (eNB) in the NB-LTE system, an NB-physical synchronization channel (NB-PSCH), the NB-PSCH including a synchronization signal and having a channel structure, the synchronization signal including a primary synchronization signal (PSS) and a secondary synchronization signal (SSS), and the channel structure defined by multiple subcarriers mutually spaced apart by about 15 kHz and located entirely within the
(Continued)

downlink transmission bandwidth. Control circuitry configured to decode the synchronization signal.

16 Claims, 13 Drawing Sheets

(51) Int. Cl.
*H04L 27/26* (2006.01)
*H04W 4/70* (2018.01)
*H04L 5/00* (2006.01)

(52) U.S. Cl.
CPC ............. *H04W 4/70* (2018.02); *H04L 5/0048* (2013.01); *H04L 5/0053* (2013.01)

(56) References Cited

U.S. PATENT DOCUMENTS

| | | | |
|---|---|---|---|
| 9,407,489 B2* | 8/2016 | Kim | H04L 27/2655 |
| 9,408,168 B2* | 8/2016 | Seo | H04J 11/0069 |
| 9,497,719 B2* | 11/2016 | You | H04J 11/0073 |
| 10,159,054 B2* | 12/2018 | Li | H04W 76/14 |
| 10,256,955 B2* | 4/2019 | Lei | H04L 5/0044 |
| 10,285,144 B2* | 5/2019 | Lei | H04J 13/0062 |
| 10,601,626 B2* | 3/2020 | Kim | H04L 27/2613 |
| 2006/0258296 A1* | 11/2006 | Steer | G01S 7/021 |
| | | | 455/67.13 |
| 2011/0129008 A1 | 6/2011 | Chmiel | |
| 2011/0206089 A1* | 8/2011 | Cho | H04W 72/042 |
| | | | 375/141 |
| 2011/0268101 A1* | 11/2011 | Wang | H04L 5/0053 |
| | | | 370/344 |
| 2013/0051371 A1* | 2/2013 | Ko | H04L 5/0055 |
| | | | 370/335 |
| 2014/0029568 A1* | 1/2014 | Wang | H04W 72/04 |
| | | | 370/330 |
| 2015/0024744 A1* | 1/2015 | Yi | H04W 4/70 |
| | | | 455/434 |
| 2015/0049741 A1* | 2/2015 | Chen | H04W 48/12 |
| | | | 370/336 |
| 2016/0212724 A1* | 7/2016 | Seo | H04W 56/0025 |
| 2016/0308637 A1* | 10/2016 | Frenne | H04J 11/0069 |
| 2016/0316374 A1* | 10/2016 | Xu | H04W 16/14 |
| 2016/0353478 A1* | 12/2016 | Kim | H04W 72/12 |
| 2017/0033843 A1* | 2/2017 | Wang | H04W 4/70 |
| 2017/0034798 A1* | 2/2017 | Lin | H04L 5/001 |
| 2017/0064685 A1* | 3/2017 | Rico Alvarino | H04B 7/0456 |
| 2017/0111894 A1* | 4/2017 | Chen | H04W 76/27 |
| 2017/0135052 A1* | 5/2017 | Lei | H04J 13/0062 |
| 2017/0265816 A1* | 9/2017 | Fung | B60R 25/25 |
| 2017/0289973 A1* | 10/2017 | Yang | H04W 72/0453 |
| 2018/0091249 A1* | 3/2018 | Han | H04L 27/2613 |
| 2018/0184390 A1* | 6/2018 | Wu | H04W 4/70 |

FOREIGN PATENT DOCUMENTS

| | | |
|---|---|---|
| CN | 103733560 A | 4/2014 |
| CN | 104202712 A | 12/2014 |
| CN | 104796242 A | 7/2015 |
| WO | 2012027880 A1 | 3/2012 |

OTHER PUBLICATIONS

APIS Technical Traning AB, "LTE-Advanced: EPO in-house course", Dec. 31, 2014, pp. 1-16.
Nokia Networks, "LTE-M-Optimizing LTE for the Internet of Things", White Paper, http://networks.nokia.com/sites/default/files/document/nokia_lte-m_-_optimizing_lte_for_the_internet_of_things_white_paper.pdf, May 1, 2015, 16 pages.
PCT/US2015/000254, International Search Report and Written Opinion, dated Apr. 13, 2016, 14 pages.

* cited by examiner

SYNCHRONIZATION SIGNALS AND CHANNEL STRUCTURE FOR NARROWBAND LTE DEPLOYMENTS

RELATED APPLICATION

This application is a national stage filing under 35 U.S.C. § 371 of International Patent Application No. PCT/US2015/00254, filed Dec. 23, 2015, which claims the benefit of U.S. Provisional Patent Application No. 62/196,530, filed Jul. 24, 2015, each of which is hereby incorporated by reference herein in its entirety.

TECHNICAL FIELD

The present disclosure generally relates to the field of wireless communications and, more particularly, to techniques for synchronization in a narrowband (NB) wireless system.

BACKGROUND INFORMATION

Machine-type communications (MTC) technology has been a work item (WI) for long term evolution (LTE) standardization efforts in connection with support of massive MTC device deployment in cellular internet of things (CIoT) application scenarios. For example, a technical specification group (TSG) radio access network (RAN) work item (WI) for release 13 of the 3$^{rd}$ Generation Partnership Project (3GPP) LTE standardization (Rel. 13) is titled, "Further LTE Physical Layer Enhancements for MTC."

DETAILED DESCRIPTION OF EMBODIMENTS

Aspects and advantages will be apparent from the following detailed description of embodiments, which proceeds with reference to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Figure 1:
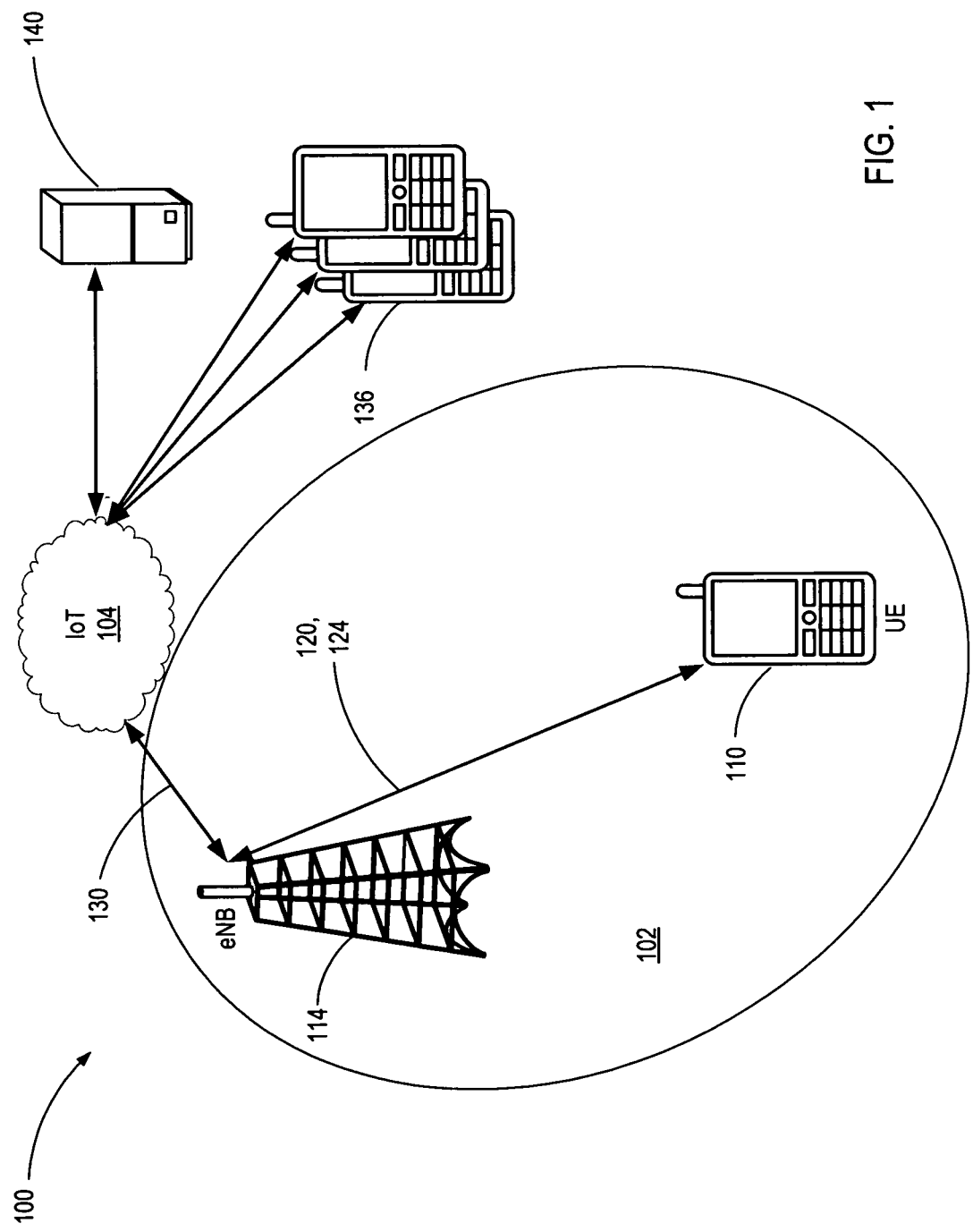
FIG. 1 is a block diagram of a user equipment (UE) embodied as a CIoT device accessing an IoT network through a wireless communication link provided by an evolved node B (eNB) in a long term evolution (LTE) network.

FIG. 1 shows a CIoT system 100 for facilitating MTC transmissions between an LTE system 102 and an IoT network 104. When a UE 110 powers on, it first determines time and frequency parameters of an evolved universal terrestrial radio access network (E-UTRAN) Node B (also known as an Evolved Node B, abbreviated as eNodeB or eNB) 114 in the LTE system 102 to enable the UE 110 to demodulate downlink (DL) signals 120 and transmit uplink (UL) signals 124 when desired. The time and frequency parameters facilitate symbol and frame timing determination, carrier frequency error estimation, and physical cell ID acquisition. Furthermore, the UE 110 in idle mode wakes up periodically to detect the synchronization signals and conduct the cell search (FIG. 2).

Upon successful synchronization and cell search, the UE 110 may then fully establish a communication link 130 from the eNB 114 to the IoT network 104. The link 130 connectivity provides for MTC transmissions between IoT devices 136 and various other devices, such as application server 140 or monitoring devices.

Figure 2:
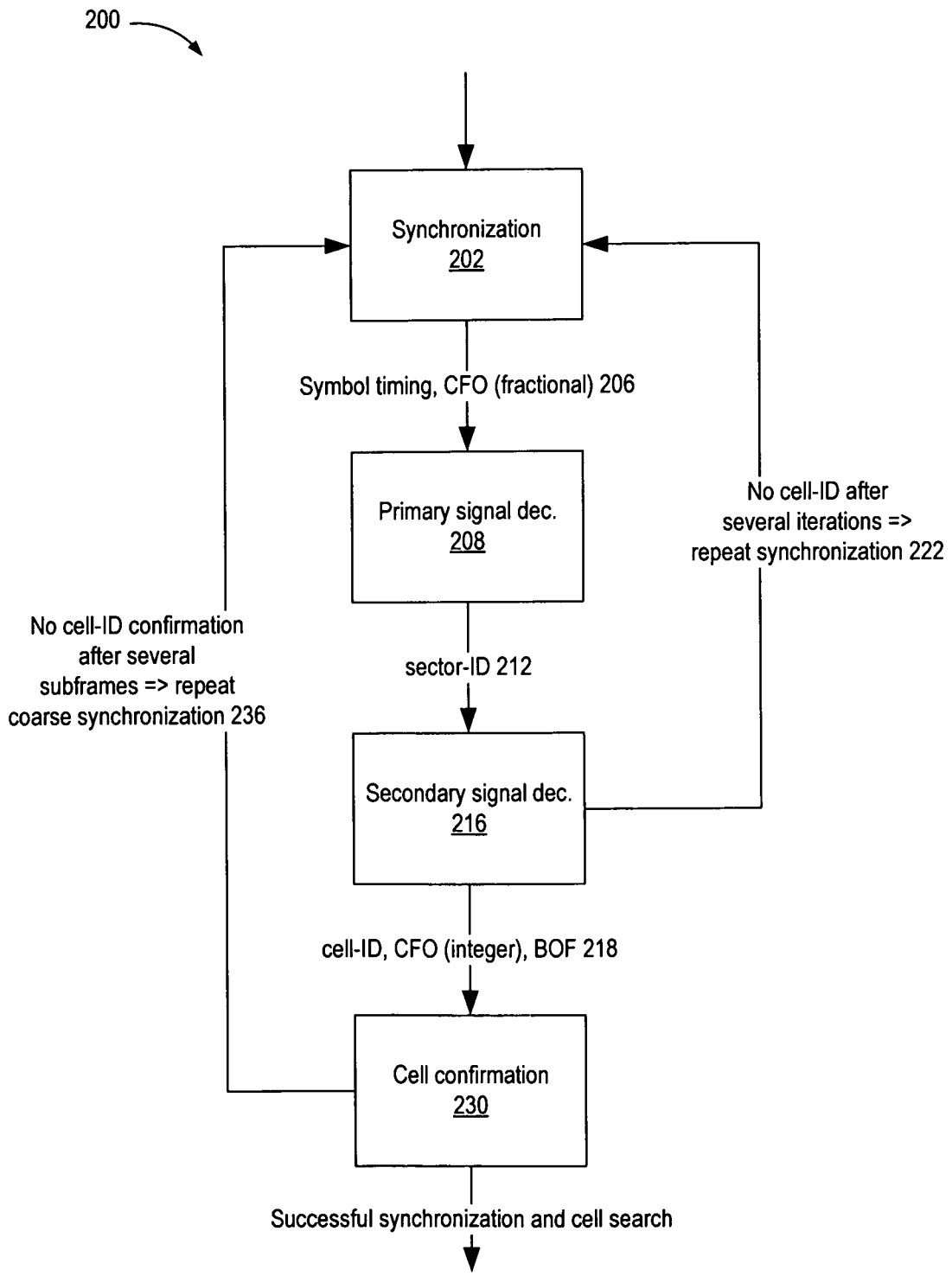
FIG. 2 is a flow chart of a synchronization and cell search procedure.

FIG. 2 depicts example procedures 200 for synchronization and cell search, which are described as follows. When a UE powers on, it attempts to acquire the time and frequency information and locate the strongest eNB in the vicinity to establish with it a network connection for wireless communications. In LTE, a primary synchronization signal (PSS) and a secondary synchronization signal (SSS) (FIG. 3) are broadcasted periodically in the downlink direction. They are transmitted twice within every 10 millisecond (ms) radio frame. The UE first uses the synchronization signals to achieve synchronization 202 of symbol timing and a fractional carrier frequency offset (CFO) 206. Then it decodes 208 a PSS to obtain a sector identification 212. After that, it decodes 216 an SSS to derive 218 a physical layer cell identity (ID) out of 504 cell IDs, and attempts to complete carrier frequency synchronization—which includes both the fractional and an integer CFO correction—and slot, subframe, and beginning of (LTE radio) frame (BOF) timing synchronization. If no cell-ID is determined, synchronization 202 is repeated 222. Otherwise, the UE undertakes to perform cell confirmation 230. If no cell is confirmed, synchronization 202 is repeated 236. After these procedures, the UE can proceed to measure the cell specific reference signals, and decode the master information block (MIB) on the physical broadcast channel (PBCH).

Figure 3:
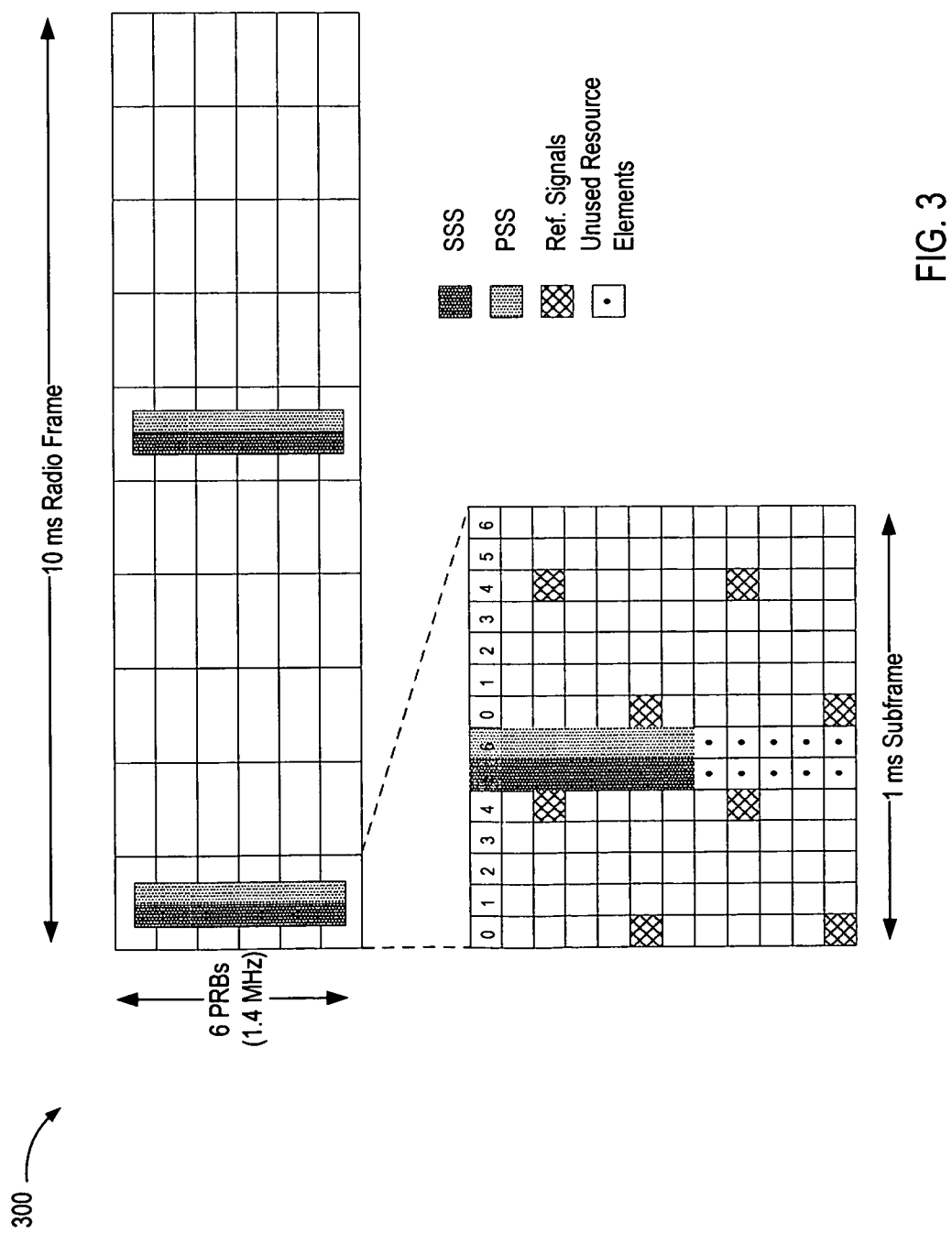
FIG. 3 is a block diagram of a frame structure in LTE systems.

Legacy LTE systems are based on a minimum bandwidth of 1.4 megahertz (MHz). But regardless of the actual available (increased) system bandwidth, a centrally located six physical resource blocks (PRBs) (i.e., PRBs spanning 1.4 MHz) have been used for the transmission of synchronization channels, which a UE uses to start the aforementioned synchronization and cell search procedure. FIG. 3 shows, in frequency and time domain, such a legacy synchronization structure 300. In the frequency domain, the PSS and SSS of the structure 300 each comprise a sequence of length 62, mapped to the central 62 subcarriers around the direct current (DC) subcarrier. In the time domain, the PSS and SSS occupy two consecutive symbols, one symbol for each synchronization signal, and are transmitted twice within the 10 ms radio frame.

In contrast, design objectives for low power and low complexity are considered for further physical layer enhancements in connection with MTC and CIoT deployments. To support a massive number of low-power and low-complexity MTC devices, a narrowband system with a bandwidth of 180 kHz is envisioned while 15 kHz subcarrier spacing remains at least on the downlink, e.g., for coexistence with legacy LTE systems. To meet the objectives, a narrow frequency downlink transmission bandwidth, e.g., 200 kilohertz (kHz) or 180 kHz—smaller than the minimum 1.4 MHz system bandwidth of legacy systems—is considered for efficient MTC operation. Thus, the six-PRB-based synchronization channel structure cannot be used, and the present disclosure describes a new design to use less bandwidth to accomplish the same functionalities as those of the legacy system.

Figure 4:
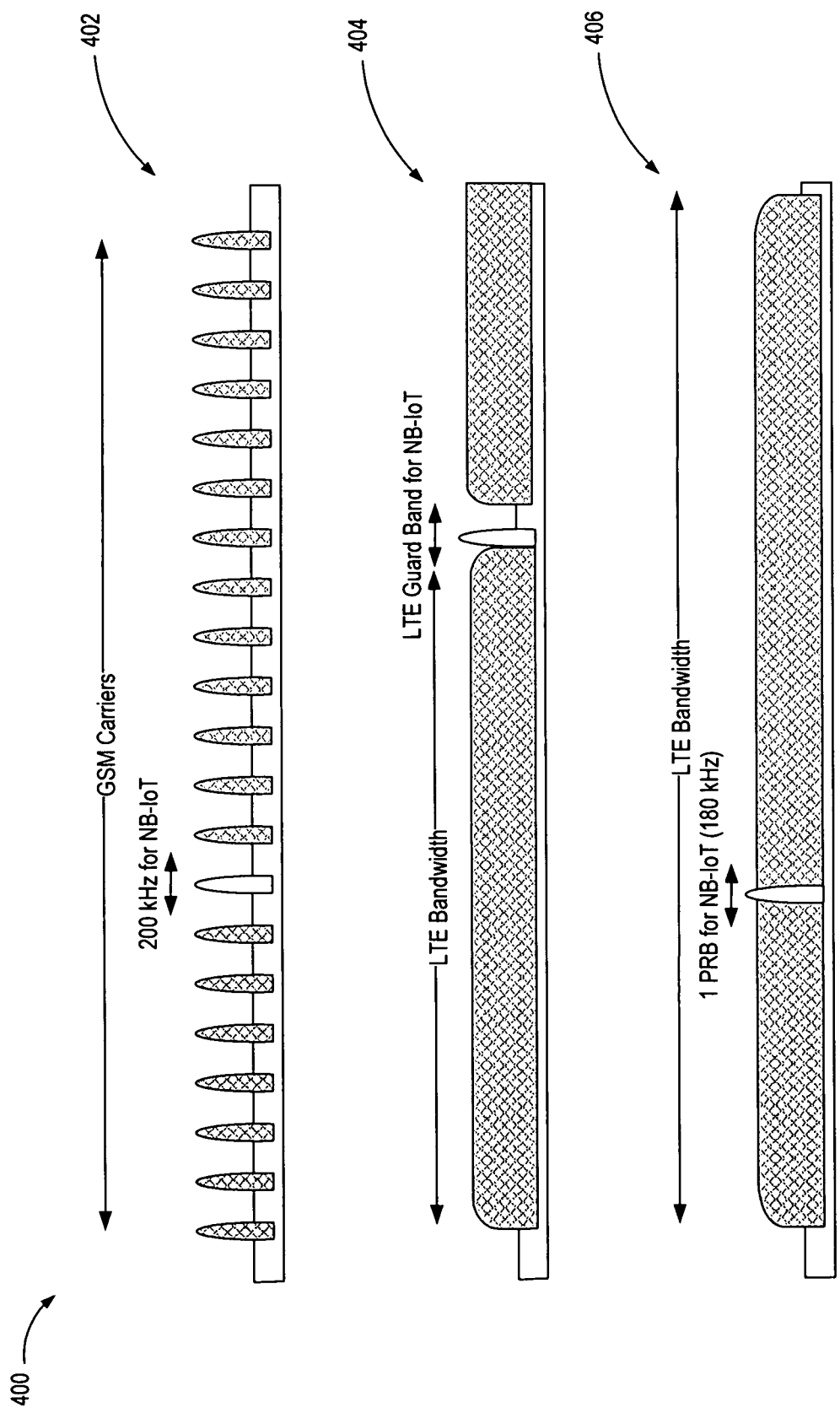
FIG. 4 shows a group of spectrum diagrams showing three examples of narrowband frequency bands located within wider-band wireless systems for use by cellular IoT devices.

Specifically, when considering a much smaller bandwidth in a range from about 180 kHz to about 200 kHz, FIG. 4 shows three example spectrum diagrams 400 for locations of such a downlink transmission bandwidth. Example 402 shows a non-LTE spectrum allocation for MTC service (e.g., in a clean slate design) as a stand-alone deployment on repurposed global system for mobile communications (GSM) spectrum band. Examples 404 and 406 show bandwidth allocations, respectively, between and within an existing LTE band (e.g., coexisting with legacy LTE UEs).

Accordingly, embodiments herein relate to synchronization channel design for a narrowband of 180 kHz. This includes various embodiments of a PSS, an SSS, and synchronization channel structure. Certain advantages of an NB-synchronization signal (SS) design are: (1) new synchronization channel structure and numerology with the time domain extension for a narrowband of ~180 kHz and subcarrier spacing of ~15 kHz; (2) new synchronization signal sequence design given the increased time uncertainty from the narrowband transmission; (3) low power design considerations with smaller sampling rate; and (4) low complexity design considerations with reduction of memory and processing resources.

Figure 5:
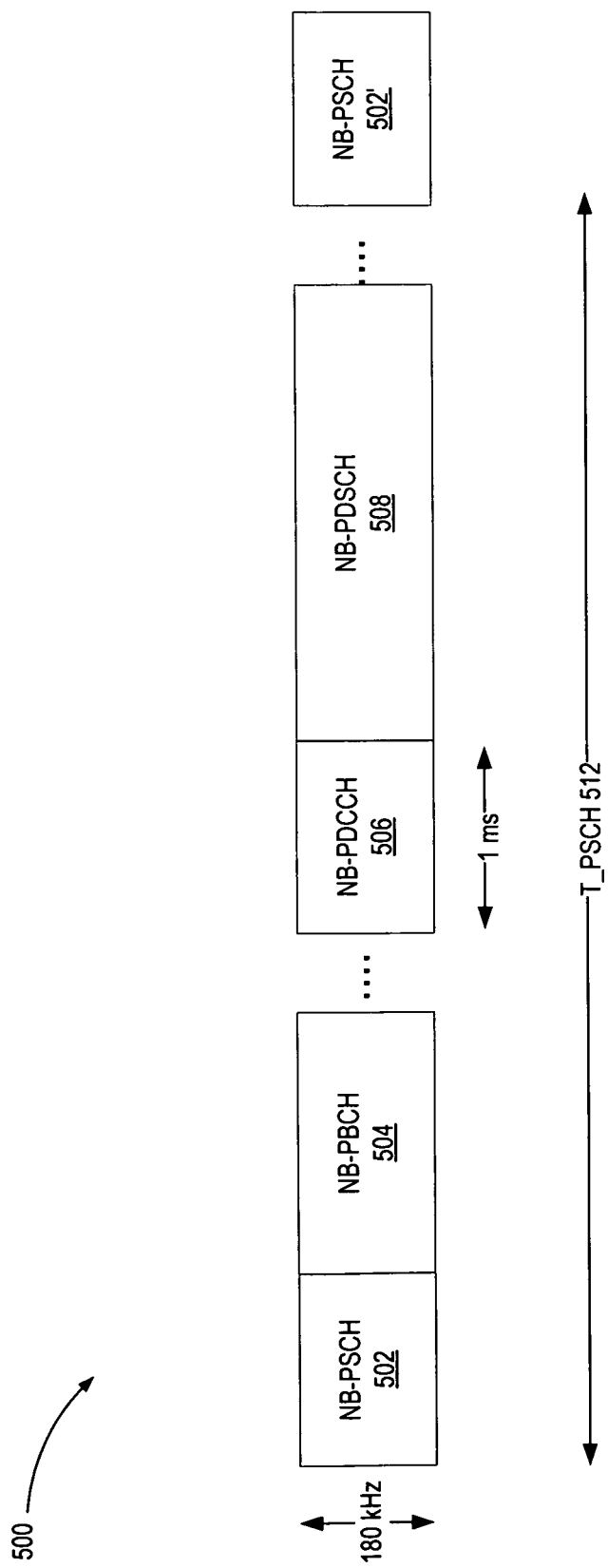
FIG. 5 is a block diagram showing a narrowband downlink channel structure.

FIG. 5 shows an example downlink channel structure 500, having a downlink bandwidth equal to that of one PRB (~180 kHz), for an NB-LTE system (also referred to as an NB-IoT system). An NB-physical synchronization channel (PSCH) 502, an NB-PBCH 504, an NB-physical downlink control channel (PDCCH) 506, and an NB-physical downlink shared channel (PDSCH) 508 are allocated in various time domain combinations or subcombinations according to time-division multiplexing (TDM). According to one embodiment, the synchronization channel, NB-PSCH 502, is transmitted periodically every duration of T_PSCH 512.

Figure 6:
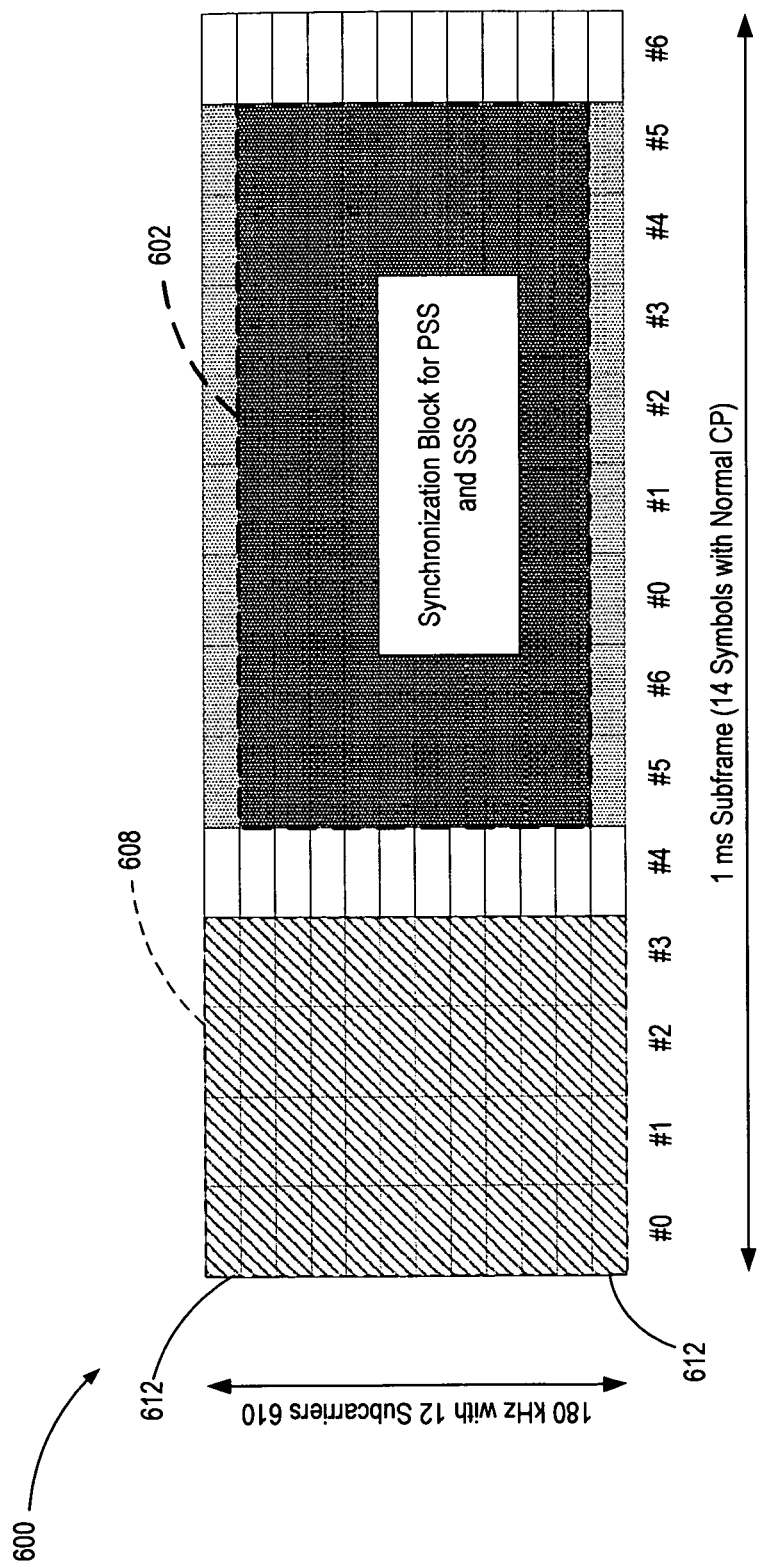
FIG. 6 is a block diagram of a synchronization block in one subframe with normal cyclic prefix.
Figure 7:
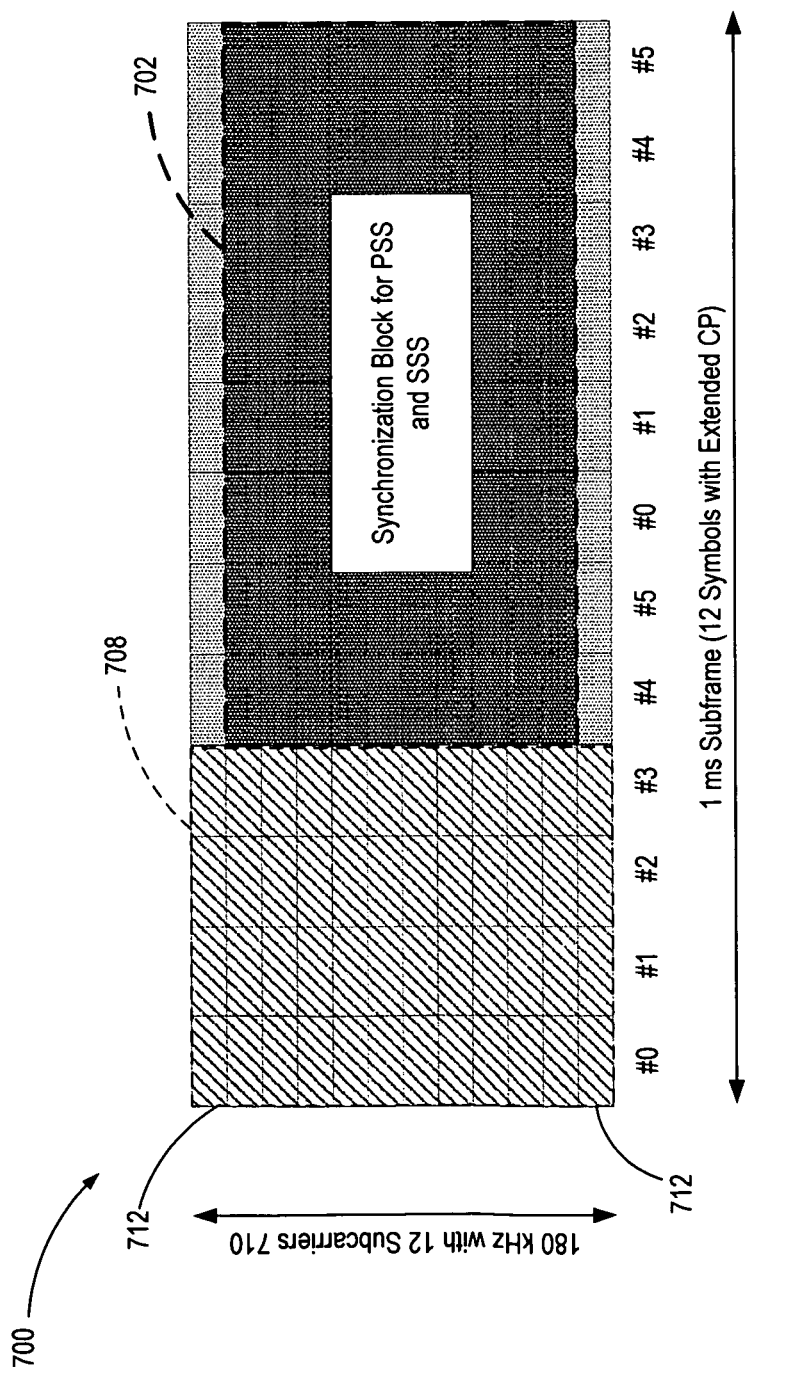
FIG. 7 is a block diagram of a synchronization block in one subframe with extended cyclic prefix.

FIGS. 6 and 7 show example subframes 600 and 700 including a synchronization block (also called a sync block or SB) structure located within one transmission time interval (TTI). Specifically, FIG. 6 shows an SB structure 602 for a normal cyclic prefix (CP) length. FIG. 7 shows an SB structure 702 for an extended CP length. The SB 602 and the SB 702 encompass the last two symbols of a first slot and first six symbols from a second slot. As described below, at least a portion of a synchronization signal sequence is provided within an SB.

FIGS. 6 and 7 also show that, with respect to the time domain, the NB-PSCH sync symbols are not allocated on a legacy DL control channel region located on a first four symbols 608, 708 of a TTI. This maintains coexistence with legacy LTE systems by avoiding resource collisions with wider-band LTE DL control channels such as, for example, a PDCCH, a physical control format indicator channel (PCFICH), and a physical hybrid-ARQ indicator channel (PHICH) within the first four symbols. Nevertheless, the NB-PSCH may still collide with LTE common reference signals (CRS) when an NB-MTC system is allocated from (and coexists with) spectrum used in a legacy LTE system. Therefore, in one embodiment that further avoids collisions on symbols beyond the legacy DL control channel region, NB-SSs are transmitted over LTE multicast-broadcast single-frequency network (MBSFN) subframes that have no CRS transmissions within the subframe beyond the legacy DL control channel region. In some embodiments, reservation for the legacy DL control channel region can be limited to a first three symbols of a TTI. In another example, the SB can be defined so as to also avoid symbols on which LTE CRSs are transmitted. Such an example design is further described later in this disclosure.

Although it is not shown in the drawing figures, a synchronization block can be allocated starting from a first symbol of one subframe. For example, such an embodiment may be used in a deployment scenario in which the NB-MTC does not coexist within a wider-band legacy LTE system and thus there is no legacy DL control channel to contend with.

FIGS. 6 and 7 also show 12 subcarriers 610, 710 in the frequency domain, and there could be two options of frequency sampling rate: 320 kHz or 160 kHz. At a higher sampling rate of 320 kHz, there are 21 complex samples per symbol given the 15 kHz subcarrier spacing. Therefore, all 12 tones may be used within the one PRB for synchronization signal sequence. On the other hand, a lower sampling rate of 160 kHz provides up to 10 complex samples per symbol and 10 out of 12 tones can be used for synchronization signal sequence. Note that the power consumption is proportional to the sampling rate. A 50% power saving could be achieved by using 10 tones instead of 11 or 12 tones at each sampling. This is especially beneficial for MTC application scenarios, in which MTC UEs remain in an idle mode most of the time and cell search (PSS/SSS detection) is the major activity that happens periodically. With this consideration, using central 10 subcarriers in synchronization blocks is preferred with a sampling rate of 160 kHz. In the meantime, one subcarrier 612, 712 of 15 kHz is kept for protection on each side of the narrowband, as is shown in FIGS. 6 and 7.

Figure 8:
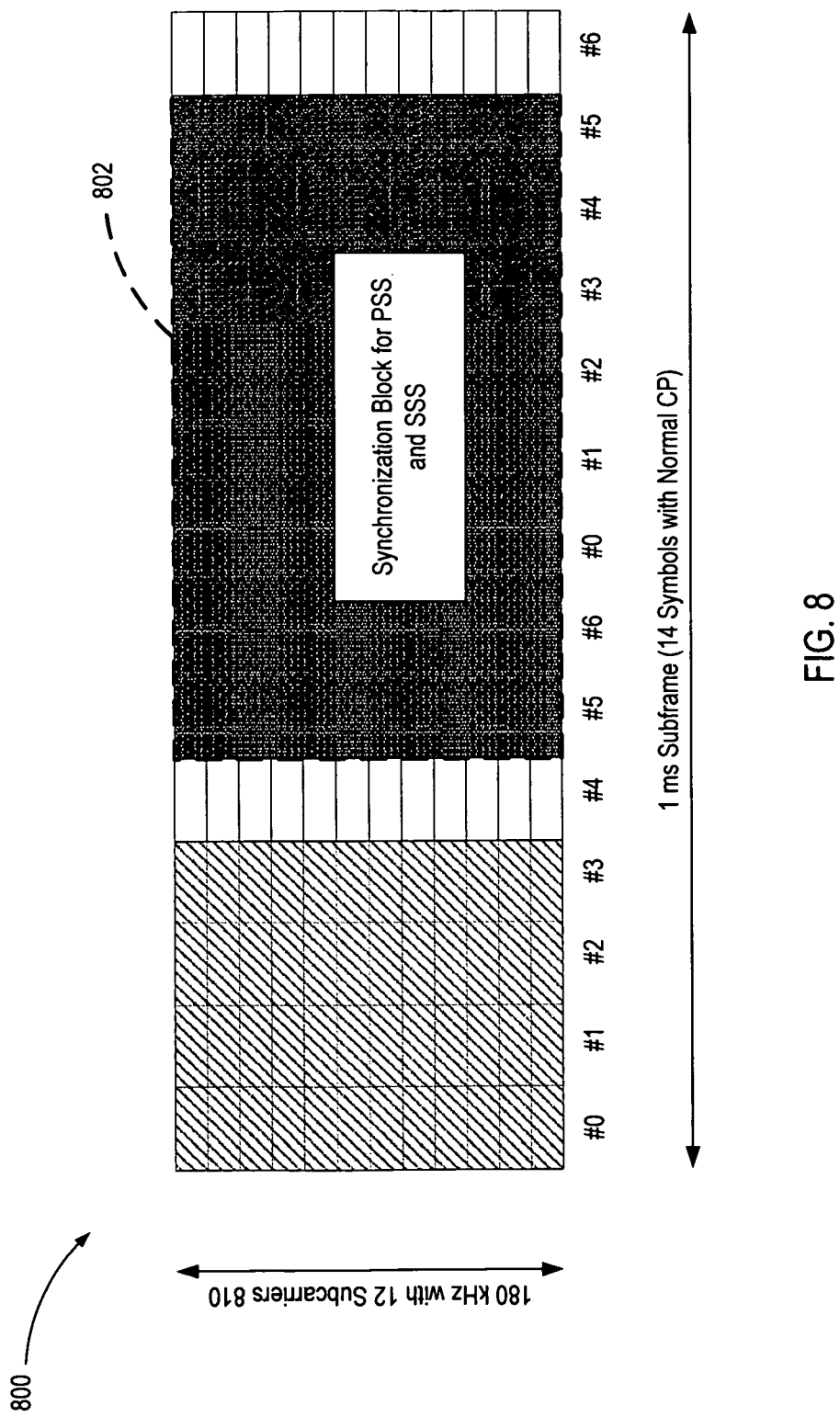
FIG. 8 is a block diagram of a synchronization block in one subframe with normal cyclic prefix, in which the synchronization block encompasses all subcarriers.

In another embodiment, FIG. 8 shows a subframe 800 in which an SB 802 is extended to have 12 subcarriers 810 allocated for NB-PSCH transmission when, for example, the 320 kHz sampling rate is adopted. In this case, a slightly longer or less punctured sequence could be used, which may provide some small enhancement on the detection performance. In another embodiment, 11 subcarriers may be used.

One related issue to this so-called one-PRB-based (narrowband) system is the location of its DC subcarrier. In the construction of an orthogonal frequency-division multiplexing (OFDM) symbol on the downlink, there may be an empty DC subcarrier in order to have the zero-intermediate frequency (IF) at the reception in order to aid direct-conversion receiver architectures. There are two general approaches at the eNB transmitter. One approach is to have all 12 subcarriers utilized at the transmitter, while the UE receiver makes no change but considers the additional interference in the minimum performance constraint or shifts the subcarrier by half so that the interference impact spreads to multiple subcarriers instead of one. Another approach is for the eNB transmitter to define one subcarrier in the middle of this narrowband as a DC subcarrier and map the data only to the other 11 subcarriers but not this DC subcarrier. Although there is no impact on the UE receiver, the available resource is reduced by 1/12. While the first approach has been assumed in this disclosure, all the design could be easily fit into 11 subcarriers for the second approach by puncturing one more symbol on the selected sequence or by sampling the signal with a higher rate of 320 kHz. Here, by puncturing, it is implied that the synchronization sequences (PSS/SSS sequences) that would otherwise be mapped to the resource elements (REs) coinciding with the DC subcarrier are simply not transmitted. For example, if sequence $\{\ldots, x_{n-2}, x_{n-1}, x_n, x_{n+1}, x_{n+2}, \ldots\}$ is mapped to subcarriers $\{\ldots, s_{n-2}, s_{n-1}, s_n, s_{n+1}, s_{n+2}, \ldots\}$, then a punctured version of the sequence mapping to subcarriers wherein the sequence index corresponding to subcarrier $s_n$ is punctured would involve the following mapping: sequence $\{\ldots, x_{n-2}, x_{n-1}, x_{n+1}, x_{n+2}, \ldots\}$ is mapped to subcarriers $\{\ldots, s_{n-2}, s_{n-1}, s_{n+1}, s_{n+2}, \ldots\}$.

With all these considerations, the selected PSS/SSS sequences could be mapped into the synchronization block in different NB-PSCH options and with different signals. Example options are described below and shown in time domain illustrations of FIGS. 9-12.

Figures 9, 10, 11, 12:
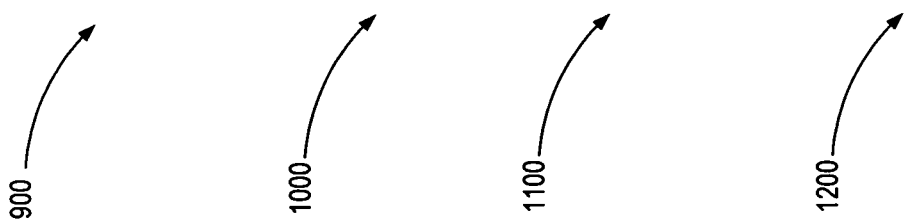
FIGS. 9, 10, 11, and 12 are block diagrams showing options for primary and secondary synchronization signal mappings in a time domain.

FIG. 9 shows a first NB-PSCH SB option 900. The synchronization block consists of a consecutive four symbols of PSS followed by a consecutive four symbols of SSS. As another example of this design option, there can be a two-symbol gap between the sets of PSS and SSS symbols for systems with a normal CP (NCP) configuration, and no gap between them for systems with an extended CP (ECP) configuration. For example, compare FIG. 6, which shows two empty symbols (#4 in a first slot and #6 in a second slot), with FIG. 7, which shows no empty symbols. Thus, subframe 600 may accommodate a two-symbol gap between PSS and SSS symbols, and each PSS and SSS is still maintained at four symbols in duration by using symbol #4 and symbol #6. Basically, this gap is spacing the PSS and SSS apart for the normal CP case. And such a gap may help the UE identify use of NCP and ECP based on the relative location of the PSS and SSS signals. This idea of different relative gaps between PSS and SSS blocks is also applicable to other NB-PSCH SB options discussed in subsequent paragraphs (e.g., options 1100 and 1200, respectively, in FIGS. 11 and 12). It is also possible to realize different sized gaps between the placement of the PSS and SSS symbols, as described later in connection with FIG. 13, which shows another example of avoiding common reference signal (CRS) symbols in an NCP configuration.

FIG. 10 shows an NB-PSCH SB option 1000. Symbol pairs of PSS sequence and SSS sequence are allocated within the sync block. These SSS symbols and PSS symbols are interleaved and alternately transmitted. This structure may help the coherent detection of SSS, once PSS is non-coherently detected.

FIG. 11 shows an NB-PSCH SB option 1100. This option includes allocating the SSS transmission between multiple PSS transmissions. In this option, the UE may perform coherent detection for SSS based on the channel estimation from PSS.

FIG. 12 shows an NB-PSCH SB option 1200. A relatively long synchronization signal sequence (i.e., one that is multiple symbols long) may be designed with a single CP 1210 for a number (L) of NB-SS symbols, preferably provided that the total duration of the option 1200 is equal to L (conventional) symbol duration(s). For example, in the example shown in FIG. 12, L equals four, and the CP 1210 is designed such that the total duration (PSS or SSS) of the option 1200 fits into four conventional LTE symbol durations.

Further, the NB-PSCH may contain N sync blocks distributed across N subframes of an NB-MTC system. While one sync block (N=1) has been assumed in the previous description, an NB-PSCH transmission over multiple consecutive synchronization blocks (N>1) can be readily extended in order to achieve a particular (e.g., extended) coverage capability and performance target. In such cases, PSS and SSS are either simply repeated or encoded with a spreading pattern over the multiple SBs, according to different design options.

Figure 13:
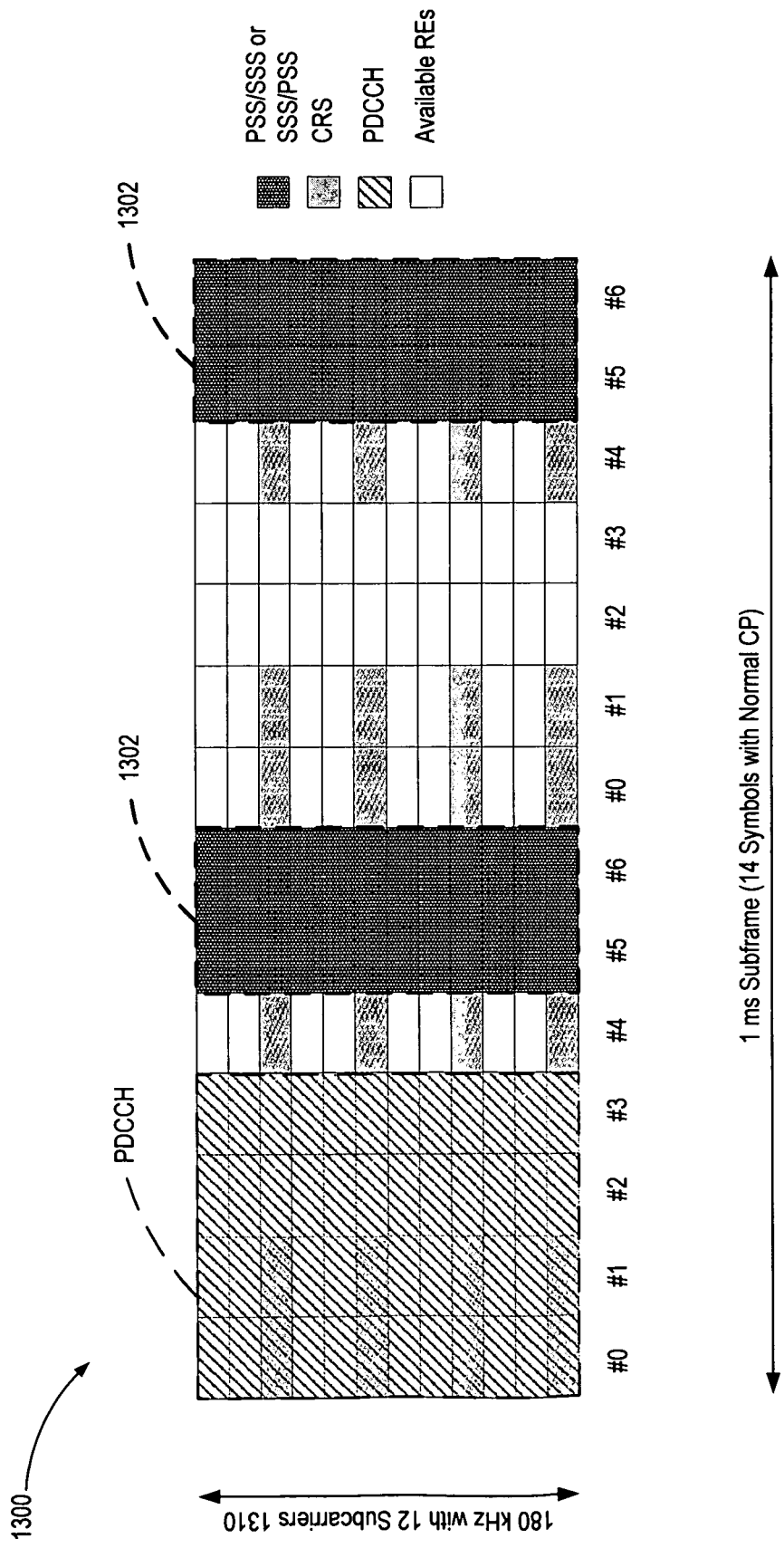
FIG. 13 is a block diagram of a synchronization block or synchronization slot in which synchronization signals are provided on a last two symbols of each slot.

FIG. 13 shows, in the context of an NCP subframe configuration 1300 (i.e., two consecutive slots of seven symbols each), that there can be a five-symbol gap between synchronization symbols 1302. And for an ECP subframe configuration (FIG. 7, two consecutive slots of six symbols each), the gap can be four symbols, assuming PSS occupies the last two symbols in the first slot and SSS occupies the last two symbols in the second slot. If additional symbols are desired, e.g., to accommodate additional repetitions of the PSS/SSS, they can be mapped to multiple (e.g., consecutive-in-time) one ms subframes.

FIG. 13 also shows that, as another embodiment, the synchronization signals are placed at the last two symbols of each slot of a subframe carrying synchronization symbols to avoid any CRS for operating in the LTE band with legacy LTE devices. The slots of the subframes with synchronization signals are referred to as so-called synchronization slots. The SSS and PSS may be paired in each slot (as described in NB-PSCH SB option 1000, FIG. 10), and could occupy N consecutive slots. When N=4, the number of symbols allocated for the NB-PSCH is equivalent to one SB, described earlier. Consequently, the mapping of a selected synchronization signal sequence to resource elements could be done in the same way for one SB or four consecutive synchronization slots. Similarly, in the frequency domain, there could be options of 10 subcarriers or 12 subcarriers, which (again) depend on sampling rate.

Although it was not shown in the previous drawing figures, the PSS/SSS signal may also transmit in all OFDM symbols that are not allocated for the legacy PDCCH and cyclic redundancy code (CRC) transmission. For instance, for an NCP subframe configuration of FIG. 13, OFDM symbols #5 and #6 in the first slot and symbols #2, #3, #5, and #6 in the second slot are available for transmission of the PSS/SSS.

Note that in the above examples, PSS is transmitted prior to SSS. However, the design can be straightforwardly extended to the case when SSS is transmitted before PSS.

Thus, FIG. 13 shows a "/" to indicate that the order of PSS/SSS and SSS/PSS are interchangeable in various embodiments.

As for the sync signal transmission periodicity, a number of options are considered. In general, a short interval leads to faster synchronization and cell search, but it also imposes large overhead on the limited resource. A longer interval is efficient in terms of the overhead, but it also may entail longer search times, which means higher power consumption. This also depends on the radio frame structure, since the frame boundary should be recovered by a single successful SSS detection.

As one example of the frame structure, we assume that a subframe group consists of six TTIs (of one ms each) and a radio frame has a length of 10 subframe groups, i.e., 60 ms. A few design options are described below for different performance considerations. The same PSS will be transmitted at each time, while the SSS should be identified with its relative location within a radio frame so that the frame boundary can be determined via a single successful SSS detection.

Transmit option T1: PSS and SSS are transmitted once every radio frame. With a radio frame of 60 ms, T_PSCH equals 60 ms. The synchronization signal starts on the #0 TTI in the 60 ms frame.

Transmit option T2: PSS and SSS are transmitted twice every radio frame as in the legacy LTE system. With a radio frame of 60 ms, T_PSCH equals 30 ms. The synchronization signal starts on the #0 and #30 TTI in the 60 ms frame.

Transmit option T3: PSS and SSS are transmitted multiple N times every radio frame. An integer N times could be selected with a T_PSCH, as long as N*T_PSCH is equal to the length of the designated radio frame.

As an example of four PSS/SSS transmissions every radio frame (N=4), with a radio frame of 60 ms, T_PSCH equals 15 ms. The synchronization signal starts on the #0, #15, #30, and #45 TTI in the 60 ms frame.

Another aspect of synchronization channel design is the signal sequence for PSS and SSS transmission. The following paragraphs provide a general overview of PSS sequence considerations and options for PSS sequences, followed by options for SSS sequences.

On the synchronization signal sequence for orthogonal frequency-division multiple access (OFDMA) systems, the Zadoff-Chu (ZC) sequence is the most important one and has been widely used in legacy LTE, including PSS/SSS, uplink random access preambles, and uplink reference signals. The ZC sequence has constant amplitude, which effectively limits the peak-to-average power ratio (PAPR). It also has ideal cyclic autocorrelation, and allows multiple orthogonal sequences to be generated from the same ZC sequence. Furthermore, it achieves minimum cross-correlation value between any two sequences with ideal autocorrelation.

On the other hand, the perfect autocorrelation property may not hold anymore when certain frequency error or timing uncertainty is present. In this case a pseudorandom number (PN) sequence could be more robust and outperform the ZC sequence.

In general, for ZC-based PSS design, several options can be considered, which depend on the ZC sequence length and the number of subcarriers allocated for PSS transmission. In the case when the ZC sequence length is less than the number of subcarriers allocated for PSS transmission, certain subcarriers in the edge of the system bandwidth can be left unused. In another embodiment, cyclic extension of the ZC sequence is employed for the PSS generation. In the case when the length of the ZC sequence is greater than the number of subcarriers allocated for PSS transmission, certain elements in the ZC sequence are punctured for the PSS symbol generation. Here, by puncturing, it is implied that if the ZC sequence with indices $\{\ldots, z_{n-3}, z_{n-2}, z_{n-1}, z_n\}$ is mapped to subcarriers $\{\ldots, s_{n-3}, s_{n-2}, s_{n-1}, s_n\}$ then a punctured version of the sequence mapping to a fewer number of subcarriers $\{\ldots, s_{n-3}, s_{n-2}\}$ would involve the following mapping: sequence $\{\ldots, z_{n-3}, z_{n-2}\}$ is mapped to subcarriers $\{\ldots, s_{n-3}, s_{n-2}\}$.

A number of options are described below for PSS sequence design, including techniques for mapping the PSS designs into a synchronization block.

PSS option P1: Short ZC sequence with repetition. A ZC sequence of length 11 (odd prime) is generated according to the following the equation.

$$d_u(n) = \begin{cases} e^{-j\frac{\pi u n(n+1)}{11}} & n = 0, 1, \ldots, 4 \\ e^{-j\frac{\pi u (n+1)(n+2)}{11}} & n = 5, 6, \ldots, 9 \end{cases}$$

where n is an index of 10 positions (or terms) in the ZC sequence, u is the root sequence index for the ZC sequence, and $d_u(n)$ represents a complex value at each position n of each root ZC sequence parameterized by u.

The ZC sequence is then punctured into a length-of-10 sequence and mapped onto the 10 central subcarriers at each symbol. A combination of three root indices out of u= $\{0, 1, \ldots, 9\}$ could be selected with the lowest frequency offset sensitivity. This may reduce the complexity at the receiver due to smaller buffer size and shorter sequence multiplication. Simple repetition of the short ZC sequence over multiple OFDM symbols could be able to compensate for the possible performance loss. Thus, a short-length ZC sequence is generated that is repeated across multiple OFDM symbols.

In another embodiment, the length-11 sequence could be cyclic-extended to a length-12 sequence when 12 subcarriers are used.

PSS option P2: Short ZC sequence with spreading code. The same short ZC sequence of length 10 as in P1 is used with a spreading code over multiple symbols, within one sync block, or over multiple sync blocks.

Without loss of generality, the following design could apply depending on the number of symbols being used. For four symbols (one sync block) of PSS, example spreading codes found to be effective are: [−1, +1, −1, −1], or [+1, +1, +1, −1]. For eight symbols of PSS (two sync blocks), example spreading codes found to be effective are: [+1, +1, −1, −1, +1, −1, −1, −1], or [−1, +1, +1, −1, −1, −1, +1, −1]. For 16 symbols of PSS (four sync blocks), example spreading codes found to be effective are: [+1, −1, −1, +1, +1, +1, −1, −1, +1, −1, +1, +1, −1, +1, −1, −1], or [−1, −1, +1, +1, −1, +1, +1, −1, −1, −1, −1, +1, +1, +1, +1, −1].

In another embodiment, the length-11 sequence could be cyclic-extended to a length-12 sequence when 12 subcarriers are used.

PSS option P3: Short ZC sequence with different root index. A ZC sequence of length 11 (odd prime) is generated following the equation in P1. It is then punctured into a length-of-10 sequence and mapped onto the 10 central subcarriers at each symbol. A set of root indices s=[u_1, u_2, u_k] are selected from u={0, 1, . . . , 9} and are used to generate the sequence for the kth PSS symbol in the sync block. Three different root index sets are pre-defined by the eNB, and a UE will identify one of the three sector IDs corresponding to the detected set of ZC sequences. In another embodiment, the length-11 sequence could be cyclic-extended to a length-12 sequence, such as when 12 subcarriers are used.

PSS option P4: Maximum length sequence (MLS, or m-sequence) with repetitions or spreading code. A benefit of the ZC sequence lies in its ideal autocorrelation property, which, however, may not hold when frequency error and timing uncertainty are present. This becomes more likely in the case of narrowband MTC, where the carrier frequency error could be higher with a low-cost oscillator adopted in an MTC device, and timing error is inherently much larger due to a smaller bandwidth of 180 kHz. In this case, for deployment in another embodiment, a simple PN (binary) sequence may be more robust.

Figure 14:
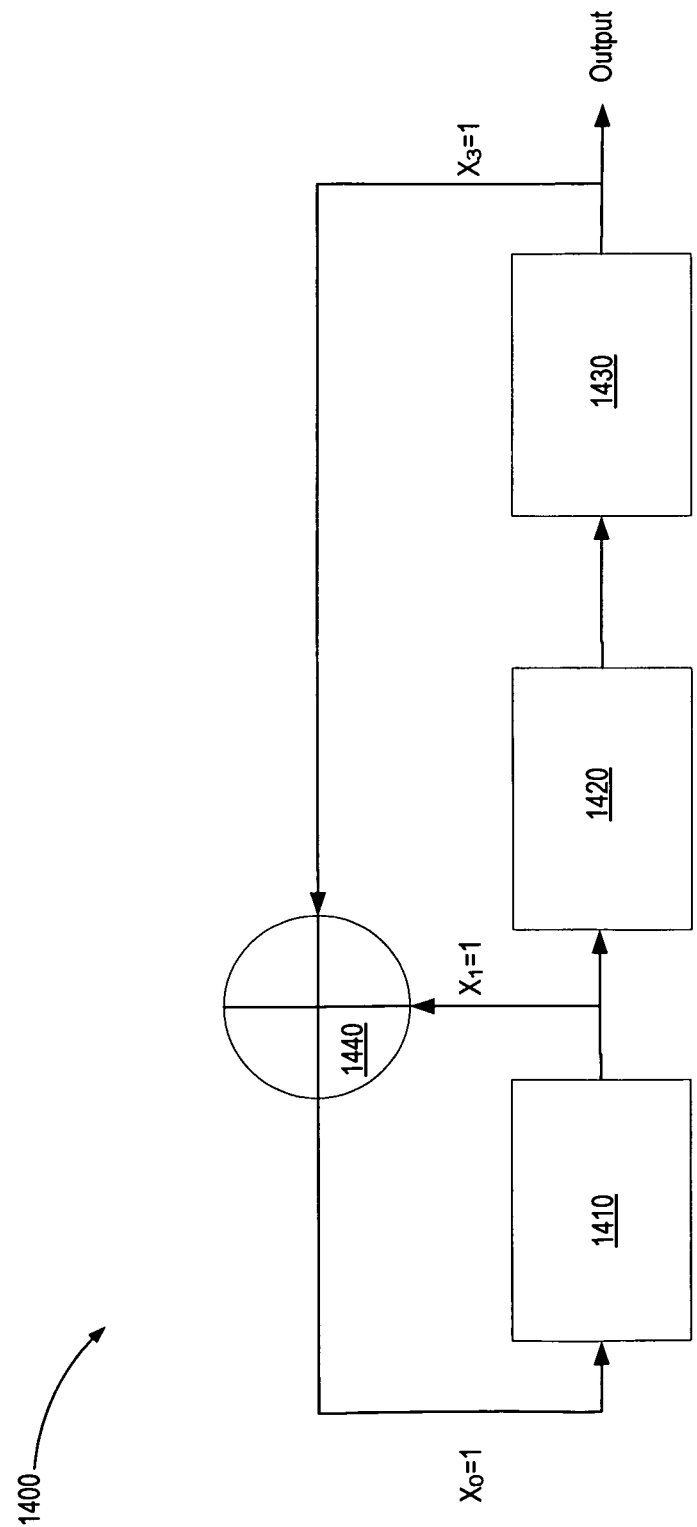
FIG. 14 is a block diagram representing logic for implementing an m-sequence length-seven generator.

FIG. 14 shows an m-sequence generator 1400 to generate a PN sequence of length seven. The generator may be embodied as a linear feedback shift register configured to implement the primitive polynomial of $x^3+x+1$. For example, FIG. 14 shows three shift (delay) registers 1410, 1420, 1430. The register 1410 receives at its input a value of $X_0$ and produces at its output a delayed version of the value, $X_1$. The value of $X_1$ is tapped for a first input of an exclusive OR (XOR) logic function 1440 and is also provided to an input of the register 1420. The register 1420 thereby receives at its input a value of $X_1$ and produces a delayed version of the value, $X_2$. The value of $X_2$ is then provided to an input of the register 1430. The register 1430 thereby receives at its input $X_2$ and produces as a system output a delayed version of the value, $X_3$. The value of $X_3$ is tapped for a second input of the XOR logic function 1440. XOR logic function 1440 performs an XOR operation from the values of $X_1$ and $X_3$ to produce the next value of $X_0$. In this way, the sequence of length seven is produced. It is then cyclic-extended into a length-10 sequence and allocated over the subcarriers on one symbol.

According to another embodiment, an m-sequence of length 15 could be generated by the primitive polynomial $x^4+x+1$. It may then be punctured into a length-10 sequence and allocated over the subcarriers on one symbol. In another embodiment, it could be punctured into a length-12 sequence (e.g., when 12 subcarriers are used).

In some embodiments, the simple repetition as described in connection with P1, or the spreading code as described in connection with P2, may be applied to extend the synchronization signals over one sync block or multiple sync blocks.

PSS option P5: Barker code with repetitions or spreading code. As a family of short-length sequence, a barker code has a good auto-correlation property and very low correlation sidelobes, and may be used in communication devices for frame synchronization. The following is an example of a length-11 barker code: [−1, −1, −1, 1, 1, 1, −1, 1, 1, −1, 1]. This code may be truncated to a length-10 sequence and allocated onto one symbol. In another embodiment, a length-11 barker code sequence could be cyclic-extended to a length-12 sequence (e.g., when 12 subcarriers are used). Also, the simple repetition as described in connection with P1, or the spreading code as described in connection with P2 can be applied to extend the synchronization signals over one sync block or multiple sync blocks.

In another embodiment, a barker code of length seven, as shown below, may be adopted. It may then be cyclic-extended into a length-10 sequence and allocated over the subcarriers on one symbol. For example, here is a barker code of length seven: [−1, −1, −1, 1, 1, −1, 1].

Secondary synchronization signals are mainly designed for a UE to determine the radio frame boundary, and identify one of the 168 cell IDs. Reuse of legacy designs is beneficial to the UE implementation. For SSS, it is possible to adopt the long sequence (length 62) from legacy LTE since it can be possible to perform frequency-domain coherent or non-coherent detection for the presence of SSS.

With regard to the number of times SSS is transmitted within the radio frame, there may be various designs depending on the number of desired sync blocks transmitted so as to enable combining of the sync blocks at the UE receiver for detection of the frame boundary based on a single SSS detection effort.

SSS option S1: SSS sequence with two length-31 m-sequences. An SSS sequence of length 62, as in the legacy LTE, may be adopted. Each SSS sequence consists of two cyclic-shifted versions (referred to as SSC1 and SSC2 in this work), each of a length-31 m-sequence, which are interleaved and scrambled after being generated as described in section 6.11.2.1 of 3GPP technical specification (TS) 36.211 V12.6.0 (2015-06). But instead of mapping the SSS sequence into one symbol, as is done in legacy LTE systems, the present option contemplates an SSS sequence that is fragmented and mapped onto multiple symbols. As an example, it can be transmitted over six synchronization slots (as explained in the synchronization slot example of FIG. 13) while the PSS may be paired with each SSS so that coherent detection can be established for the SSS. This particular variant is compatible with transmit option T2. In other words, the PSS and SSS are transmitted twice every radio frame, i.e., every 30 ms (for a radio frame length of 60 ms).

SSS option S2: M-sequence without interleaving and scrambling. The same two length-31 m-sequences (of option S1) are used and simply concatenated without interleaving and scrambling. This significantly reduces receiver complexity when the SSS sequence is being transmitted only once within a radio frame, e.g., as in transmit option T1.

Moreover, short sequences are also considered for implementation and operation simplicity. Similar to one of the options in PSS, an m-sequence of length 15 could be generated using the primitive polynomial $x^4+x+1$. It is then punctured into a length-10 or length-12 sequence and allocated over the subcarriers on one symbol. There are a large number of different ways to puncture three or five symbols out of 15 symbols. As a result, one can easily establish a mapping of a unique punctured m-sequence to one of the 168 cell IDs.

In the meantime, due to the inferior detection performance of the short sequence, multiple symbols carrying the same SSS sequence with spreading code are expected to boost the signal-to-noise ratio at the detection.

SSS option S3: SSS is transmitted once every radio frame. If one sync block is transmitted once every radio frame, one of the following sequences is applied over the four symbols of SSS: [−1, +1, −1, −1], or [+1, +1, +1, −1]. If two consecutive sync blocks are transmitted once every radio frame, one of the following sequences is applied over the eight symbols of SSS: [+1, +1, −1, −1, +1, −1, −1, −1], or [−1, +1, +1, −1, −1, −1, +1, −1]. If four consecutive sync blocks are transmitted once every radio frame, one of the following sequences is applied over the 16 symbols of SSS: [+1, −1, −1, +1, +1, +1, −1, −1, +1, −1, +1, +1, −1, +1, −1, −1], or [−1, −1, +1, +1, −1, +1, +1, −1, −1, −1, −1, +1, +1, +1, +1, −1].

SSS option S4: SSS is transmitted twice every radio frame. If one sync block is transmitted twice every radio frame, the following two sequences are applied alternately over the two SSS transmissions: [−1, +1, −1, −1], and [+1, +1, +1, −1]. If two consecutive sync blocks are transmitted twice every radio frame, the following two sequences are applied alternately over the two SSS transmissions: [+1, +1, −1, −1, +1, −1, −1, −1], and [−1, +1, +1, −1, −1, −1, +1, −1]. If four consecutive sync blocks are transmitted twice every radio frame, the following two sequences are applied alternately over the two SSS transmissions: [+1, −1, −1, +1, +1, +1, −1, −1, +1, −1, +1, +1, −1, +1, −1, −1], and [−1, −1, +1, +1, −1, +1, +1, −1, −1, −1, −1, +1, +1, +1, +1, −1].

The UE will be able to determine the frame boundary with a single detection of the SSS sequence based on its spreading code.

Furthermore, SSS can be transmitted multiple times, especially for a very long radio frame. Following the same approach, additional sequences could be found via computer search and applied to the different SSS occasions so that each SSS can be uniquely identified and the frame boundary can be determined by a single SSS detection.

For the interleaved SSS and PSS of option 1000, if the PSS has been identified with only one symbol, then the UE could be able to determine the CP length (normal or extended) by obtaining the absolution position of the following SSS symbol. However, if it takes multiple symbols for PSS detection, then there could be more hypothesis before the CP length could be determined.

In the meantime, the above design has been made mainly for LTE frequency division duplex (FDD) systems. It is straightforward to extend the design to time division duplex (TDD) systems with a slightly different relative PSS/SSS location. At the synchronization procedure, the detected relative location of PSS and SSS can be used by the UE to determine whether the network is in FDD or TDD mode.

In another embodiment, the determination of CP length and/or FDD/TDD system can be realized by using different spreading codes. For instance, for normal CP, the spreading code applied on the PSS signal can be [−1, +1, −1, −1], while for extended CP, the spreading code for the transmission of PSS signal can be [+1, +1, +1, −1]. The same design principle can be applied for the differentiation of FDD/TDD system.

As used herein, the term "circuitry" may refer to, be part of, or include an application specific integrated circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 15:
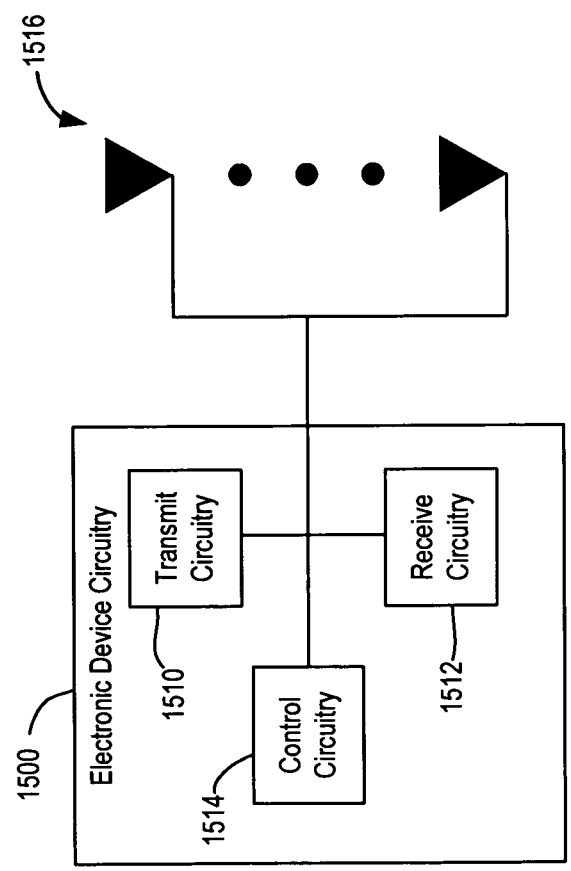
FIG. 15 is a block diagram of electronic device circuitry.

FIG. 15 is a block diagram illustrating electronic device circuitry 1500 that may be eNB circuitry, UE circuitry, network node circuitry, or some other type of circuitry in accordance with various embodiments. In embodiments, the electronic device circuitry 1500 may be, or may be incorporated into or otherwise a part of, an eNB, a UE, a network node, or some other type of electronic device. In embodiments, the electronic device circuitry 1500 may include radio transmit circuitry 1510 and receive circuitry 1512 coupled to control circuitry 1514. In embodiments, the transmit circuitry 1510 and/or receive circuitry 1512 may be elements or modules of transceiver circuitry, as shown. The electronic device circuitry 1500 may be coupled with one or more antenna elements 1516 of one or more antennas. The electronic device circuitry 1500 and/or the components of the electronic device circuitry 1500 may be configured to perform operations similar to those described elsewhere in this disclosure.

In embodiments where the electronic device circuitry 1500 is a UE, or is incorporated into or otherwise part of a UE, the receive circuitry 1512 may be configured to receive, through a downlink transmission of an evolved node B (eNB) in the NB-LTE system, an NB-physical synchronization channel (NB-PSCH), the NB-PSCH including a synchronization signal and having a channel structure, the synchronization signal including a primary synchronization signal (PSS) and a secondary synchronization signal (SSS), and the channel structure defined by multiple subcarriers mutually spaced apart by about 15 kHz and located entirely within the downlink transmission bandwidth. The control circuitry 1514 may then be configured to decode the synchronization signal to acquire time and frequency parameters from the eNB for establishing with it a connection for uplink transmission of MTC information from the UE.

Figure 16:
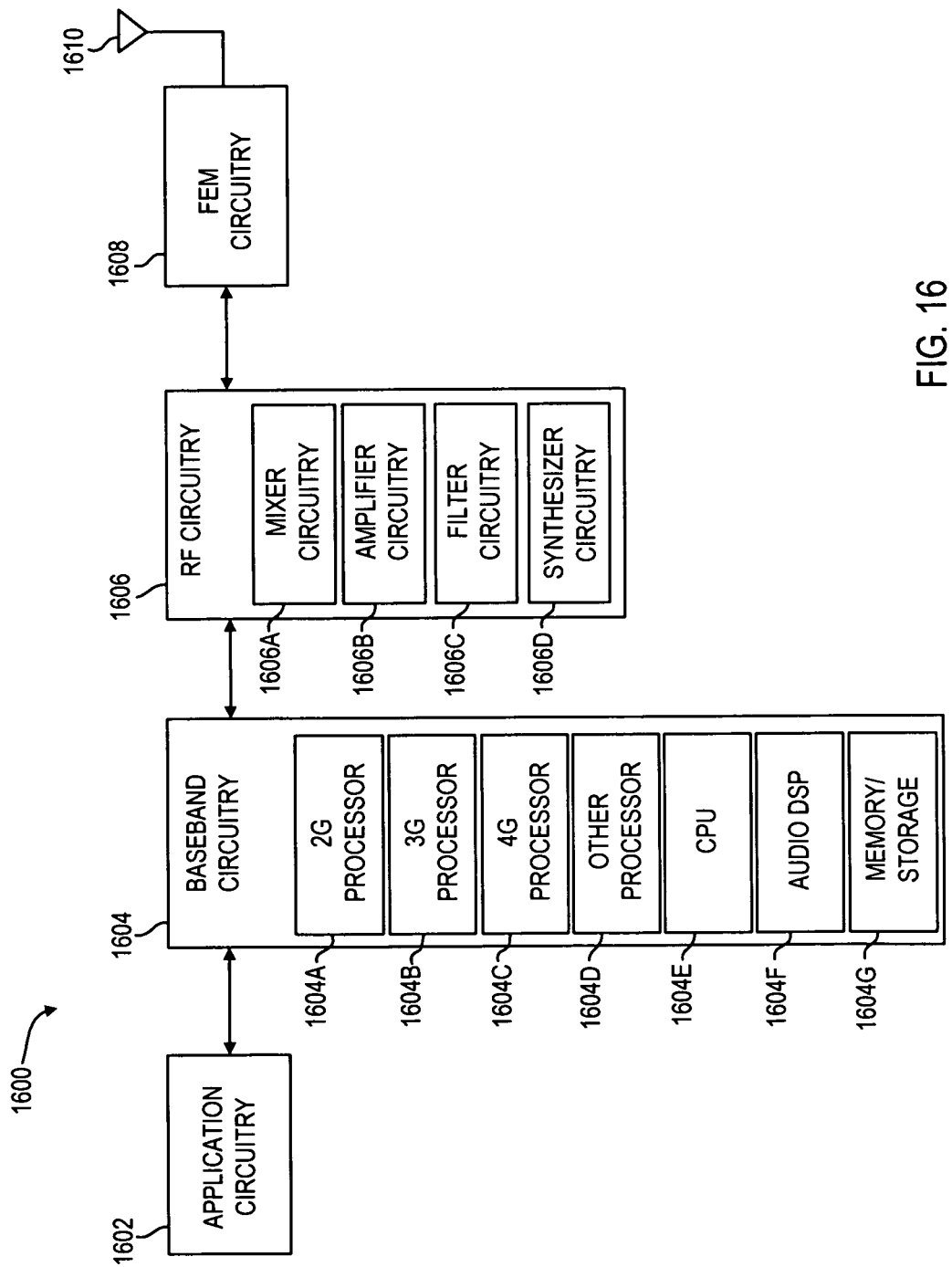
FIG. 16 is a block diagram of a UE.

Embodiments described herein may be implemented into a system using any suitably configured hardware and/or software. FIG. 16 is a block diagram illustrating, for one embodiment, example components of a user equipment (UE) device 1600. In some embodiments, the UE device 1600 may include application circuitry 1602, baseband circuitry 1604, radio frequency (RF) circuitry 1606, front-end module (FEM) circuitry 1608, and one or more antennas 1610, coupled together at least as shown in FIG. 16.

The application circuitry 1602 may include one or more application processors. By way of non-limiting example, the application circuitry 1602 may include one or more single-core or multi-core processors. The processor(s) may include any combination of general-purpose processors and dedicated processors (e.g., graphics processors, application processors, etc.). The processor(s) may be operably coupled to and/or include memory/storage, and may be configured to execute instructions stored in the memory/storage to enable various applications and/or operating systems to run on the system.

By way of non-limiting example, the baseband circuitry 1604 may include one or more single-core or multi-core processors. The baseband circuitry 1604 may include one or more baseband processors and/or control logic. The baseband circuitry 1604 may be configured to process baseband signals received from a receive signal path of the RF circuitry 1606. The baseband 1604 may also be configured to generate baseband signals for a transmit signal path of the RF circuitry 1606. The baseband circuitry 1604 may interface with the application circuitry 1602 for generation and processing of the baseband signals, and for controlling operations of the RF circuitry 1606.

By way of non-limiting example, the baseband circuitry 1604 may include at least one of a second generation (2G) baseband processor 1604A, a third generation (3G) baseband processor 1604B, a fourth generation (4G) baseband processor 1604C, and other baseband processor(s) 1604D for other existing generations and generations in development or to be developed in the future (e.g., fifth generation (5G), 6G, etc.). The baseband circuitry 1604 (e.g., at least one of baseband processors 1604A-1604D) may handle various radio control functions that enable communication with one or more radio networks via the RF circuitry 1606. By way of non-limiting example, the radio control functions may include signal modulation/demodulation, encoding/decoding, radio frequency shifting, other functions, and combinations thereof. In some embodiments, modulation/demodulation circuitry of the baseband circuitry 1604 may be programmed to perform Fast-Fourier Transform (FFT), precoding, constellation mapping/demapping functions, other functions, and combinations thereof. In some embodiments, encoding/decoding circuitry of the baseband circuitry 1604 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1604 may include elements of a protocol stack. By way of non-limiting example, elements of an evolved universal terrestrial radio access network (EUTRAN) protocol include, for example, physical (PHY), media access control (MAC), radio link control (RLC), packet data convergence protocol (PDCP), and/or radio resource control (RRC) elements. A central processing unit (CPU) 1604E of the baseband circuitry 1604 may be programmed to run elements of the protocol stack for signaling of the PHY, MAC, RLC, PDCP and/or RRC layers. In some embodiments, the baseband circuitry 1604 may include one or more audio digital signal processor(s) (DSP) 1604F. The audio DSP(s) 1604F may include elements for compression/decompression and echo cancellation. The audio DSP(s) 1604F may also include other suitable processing elements.

The baseband circuitry 1604 may further include memory/storage 1604G. The memory/storage 1604G may include data and/or instructions for operations performed by the processors of the baseband circuitry 1604 stored thereon. In some embodiments, the memory/storage 1604G may include any combination of suitable volatile memory and/or non-volatile memory. The memory/storage 1604G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1604G may be shared among the various processors or dedicated to particular processors.

Components of the baseband circuitry 1604 may be suitably combined in a single chip or a single chipset, or disposed on a same circuit board in some embodiments. In some embodiments, some or all of the constituent components of the baseband circuitry 1604 and the application circuitry 1602 may be implemented together, such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EUTRAN) and/or other wireless metropolitan area networks (WMAN), a wireless local area network (WLAN), or wireless personal area network (WPAN). Embodiments in which the baseband circuitry 1604 is configured to support radio communications of more than one wireless protocol may be referred to as multi-mode baseband circuitry.

The RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. The RF circuitry 1606 may include a receive signal path, which may include circuitry to down-convert RF signals received from the FEM circuitry 1608, and provide baseband signals to the baseband circuitry 1604. The RF circuitry 1606 may also include a transmit signal path, which may include circuitry to up-convert baseband signals provided by the baseband circuitry 1604, and provide RF output signals to the FEM circuitry 1608 for transmission.

In some embodiments, the RF circuitry 1606 may include a receive signal path and a transmit signal path. The receive signal path of the RF circuitry 1606 may include mixer circuitry 1606A, amplifier circuitry 1606B, and filter circuitry 1606C. The transmit signal path of the RF circuitry 1606 may include filter circuitry 1606C and mixer circuitry 1606A. The RF circuitry 1606 may further include synthesizer circuitry 1606D configured to synthesize a frequency for use by the mixer circuitry 1606A of the receive signal path and the transmit signal path. In some embodiments, the mixer circuitry 1606A of the receive signal path may be configured to down-convert RF signals received from the FEM circuitry 1608 based on the synthesized frequency provided by synthesizer circuitry 1606D. The amplifier circuitry 1606B may be configured to amplify the down-converted signals.

The filter circuitry 1606C may include a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may include zero-frequency baseband signals, although this is optional, of course. In some embodiments, the mixer circuitry 1606A of the receive signal path may comprise passive mixers, although the scope of the embodiments is not limited in this respect.

In some embodiments, the mixer circuitry 1606A of the transmit signal path may be configured to up-convert input baseband signals based on the syntheized frequency provided by the synthesizer circuitry 1606D to generate RF output signals for the FEM circuitry 1608. The baseband signals may be provided by the baseband circuitry 1604 and may be filtered by filter circuitry 1606C. The filter circuitry 1606C may include a low-pass filter (LPF), although the scope of the embodiments is not limited in this respect.

In some embodiments, the mixer circuitry 1606A of the receive signal path and the mixer circuitry 1606A of the transmit signal path may include two or more mixers, and may be arranged for quadrature downconversion and/or upconversion, respectively. In some embodiments, the mixer circuitry 1606A of the receive signal path and the mixer circuitry 1606A of the transmit signal path may include two or more mixers and may be arranged for image rejection (e.g., Hartley image rejection). In some embodiments, the mixer circuitry 1606A of the receive signal path and the mixer circuitry 1606A of the transmit signal path may be arranged for direct downconversion and/or direct upconversion, respectively. In some embodiments, the mixer circuitry 1606A of the receive signal path and the mixer circuitry 1606A of the transmit signal path may be configured for super-heterodyne operation.

In some embodiments, the output baseband signals and the input baseband signals may be analog baseband signals, although the scope of the embodiments is not limited in this respect. In other embodiments, the output baseband signals and the input baseband signals may be digital baseband signals. In such embodiments, the RF circuitry 1606 may include analog-to-digital converter (ADC) and digital-to-analog converter (DAC) circuitry, and the baseband circuitry 1604 may include a digital baseband interface to communicate with the RF circuitry 1606.

In some dual-mode embodiments, separate radio integrated circuit (IC) circuitry may be provided for processing signals for each spectrum, although the scope of the embodiments is not limited in this respect.

In some embodiments, the synthesizer circuitry 1606D may include one or more of a fractional-N synthesizer and a fractional N/N+1 synthesizer, although the scope of the embodiments is not limited in this respect, as other types of frequency synthesizers may be suitable. For example, synthesizer circuitry 1606D may include a delta-sigma synthesizer, a frequency multiplier, a synthesizer comprising a phase-locked loop with a frequency divider, other synthesizers, and combinations thereof.

The synthesizer circuitry 1606D may be configured to synthesize an output frequency for use by the mixer circuitry 1606A of the RF circuitry 1606 based on a frequency input and a divider control input. In some embodiments, the synthesizer circuitry 1606D may be a fractional N/N+1 synthesizer.

In some embodiments, frequency input may be provided by a voltage controlled oscillator (VCO). Divider control input may be provided by either the baseband circuitry 1604 or the applications circuitry 1602 depending on the desired output frequency. In some embodiments, a divider control input (e.g., N) may be determined from a look-up table based on a channel indicated by the application circuitry 1602.

The synthesizer circuitry 1606D of the RF circuitry 1606 may include a divider, a delay-locked loop (DLL), a multiplexer, and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements, a phase detector, a charge pump, and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1606D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

The FEM circuitry 1608 may include a receive signal path, which may include circuitry configured to operate on RF signals received from one or more antennas 1610, amplify the received signals, and provide the amplified versions of the received signals to the RF circuitry 1606 for further processing. The FEM circuitry 1608 may also include a transmit signal path, which may include circuitry configured to amplify signals for transmission provided by the RF circuitry 1606 for transmission by at least one of the antennas 1610.

In some embodiments, the FEM circuitry 1608 may include a TX/RX switch configured to switch between a transmit mode and a receive mode operation. The FEM circuitry 1608 may include a receive signal path and a transmit signal path. The receive signal path of the FEM circuitry 1608 may include a low-noise amplifier (LNA) to amplify received RF signals and provide the amplified received RF signals as an output (e.g., to the RF circuitry 1606). The transmit signal path of the FEM circuitry 1608 may include a power amplifier (PA) configured to amplify input RF signals (e.g., provided by RF circuitry 1606), and one or more filters configured to generate RF signals for subsequent transmission (e.g., by one or more of the antennas 1610).

In some embodiments, the UE device 1600 may include additional elements such as, for example, memory/storage, a display, a camera, one or more sensors, an input/output (I/O) interface, other elements, and combinations thereof.

In some embodiments, the UE device 1600 may be configured to perform one or more processes, techniques, and/or methods as described herein, or portions thereof.

EXAMPLES

1. A user equipment (UE) for providing machine type communications (MTC) through a narrowband (NB)-long term evolution (LTE) system having a downlink transmission bandwidth in a range from about 180 kilohertz (kHz) to about 200 kHz, the UE comprising: receiver circuitry configured to receive, through a downlink transmission of an evolved node B (eNB) in the NB-LTE system, an NB-physical synchronization channel (NB-PSCH), the NB-PSCH including a synchronization signal and having a channel structure, the synchronization signal including a primary synchronization signal (PSS) and a secondary synchronization signal (SSS), and the channel structure defined by multiple subcarriers mutually spaced apart by about 15 kHz and located entirely within the downlink transmission bandwidth; and control circuitry configured to decode the synchronization signal to acquire time and frequency parameters from the eNB for establishing with it a connection for uplink transmission of MTC information from the UE.

2. The UE of any other example, in which the receiver circuitry is further configured to receive, according to a time-division multiplexing (TDM) of the downlink transmission, the NB-PSCH during a first TDM portion of the downlink transmission and one or more other downlink channels during a second TDM portion of the downlink transmission.

3. The UE of example 1 or 2, in which the synchronization signal is mapped onto a central 10 subcarriers of the multiple subcarriers at a sampling rate of 160 kHz such that a first null subcarrier borders a highest frequency subcarrier of the central 10 subcarriers and a second null subcarrier borders a lowest frequency subcarrier of the central 10 subcarriers.

4. The UE of any other example, in which the PSS and SSS are located in a synchronization block of a single subframe having consecutive first and second slots, the synchronization block spanning a last two symbols of the first slot and a first six symbols of the second slot.

5. The UE of any other example, in which the PSS and SSS are located in a synchronization block of a subframe, the synchronization block including a last two symbols of each slot in the subframe.

6. The UE of any other example, in which the PSS is located in a first portion of symbols of the synchronization block and the SSS is located in a second portion of symbols of the synchronization block that is different from the first portion of symbols.

7. The UE of any other example, in which the PSS and SSS are interleaved in a time domain among symbols of the NB-PSCH to facilitate coherent detection of the SSS.

8. The UE of any other example, in which the SSS is located between multiple PSS transmissions to facilitate coherent detection.

9. The UE of any other example, in which the synchronization signal includes a synchronization signal sequence having a single cyclic prefix (CP) for multiple subsequent NB-synchronization symbols (NB-SS) and having a total duration equal to that of multiple symbol durations.

10. The UE of any other example, in which the PSS includes a length-62 Zadoff-Chu sequence provided over seven symbols according to a normal cyclic prefix (CP) configuration or over six symbols according to an extended CP and puncturing configuration.

11. The UE of any other example, in which the PSS includes a truncated length-10 Zadoff-Chu sequence or cyclic extended length-12 sequence repeated over multiple symbols according to a repetition pattern.

12. The UE of any other example, in which the PSS includes a truncated length-10 Zadoff-Chu sequence or cyclic extended length-12 sequence repeated over multiple symbols according to a spreading code.

13. The UE of any other example, in which the PSS includes a member of a set of a truncated length-10 Zadoff-Chu sequence or cyclic extended length-12 sequence provided over multiple symbols, each member of the set being generated from a different root index under a pre-defined root index pattern.

14. The UE of any other example, in which the PSS includes a member of a set of a length-15 m-sequence spread over multiple symbols according to a spreading code.

15. The UE of any other example, in which the PSS is truncated to a length-10 sequence or a cyclic extended length-12 sequence based on a length-11 or length-seven barker code.

16. The UE of any other example, in which the SSS includes two interleaved and scrambled length-31 m-sequences, and the receiver circuitry is configured to receive the SSS twice each radio frame.

17. The UE of any other example, in which the SSS includes two length-31 m-sequences without interleaving and scrambling.

18. The UE of any other example, in which the SSS includes a member of a set of a punctured pseudorandom number (PN) sequence spread over multiple symbols based on a spreading code.

19. The UE of any other example, in which the UE is configured to determine a frame boundary based on detection of the spreading code.

20. The UE of any other example, in which the PSS and SSS are transmitted once, twice, or four times in a radio frame, and the UE is configured to identify a frame boundary by successful detection of the SSS.

21. A method performed by a user equipment (UE) for providing machine type communications (MTC) through a narrowband (NB)-long term evolution (LTE) system having a downlink transmission bandwidth in a range from about 180 kilohertz (kHz) to about 200 kHz, the method comprising: receiving, through a downlink transmission of an evolved node B (eNB) in the NB-LTE system, an NB-physical synchronization channel (NB-PSCH), the NB-PSCH including a synchronization signal and having a channel structure, the synchronization signal including a primary synchronization signal (PSS) and a secondary synchronization signal (SSS), and the channel structure defined by multiple subcarriers mutually spaced apart by about 15 kHz and located entirely within the downlink transmission bandwidth; and decoding the synchronization signal to acquire time and frequency parameters from the eNB for establishing with it a connection for uplink transmission of MTC information from the UE.

22. The method of any other example, further comprising receiving, according to a time-division multiplexing (TDM) of the downlink transmission, the NB-PSCH during a first TDM portion of the downlink transmission and one or more other downlink channels during a second TDM portion of the downlink transmission.

23. The method of any other example, in which the synchronization signal is mapped onto a central 10 subcarriers of the multiple subcarriers at a sampling rate of 160 kHz such that a first null subcarrier borders a highest frequency subcarrier of the central 10 subcarriers and a second null subcarrier borders a lowest frequency subcarrier of the central 10 subcarriers.

24. The method of any other example, in which the PSS and SSS are located in a synchronization block of a single subframe having consecutive first and second slots, the synchronization block spanning a last two symbols of the first slot and a first six symbols of the second slot.

25. The method of any other example, in which the PSS and SSS are located in a synchronization block of a subframe, the synchronization block including a last two symbols of each slot in the subframe.

26. The method of any other example, in which the PSS is located in a first portion of symbols of the synchronization block and the SSS is located in a second portion of symbols of the synchronization block that is different from the first portion of symbols.

27. The method of any other example, in which the PSS and SSS are interleaved in a time domain among symbols of the NB-PSCH to facilitate coherent detection of the SSS.

28. The method of any other example, in which the SSS is located between multiple PSS transmissions to facilitate coherent detection.

29. The method of any other example, in which the synchronization signal includes a synchronization signal sequence having a single cyclic prefix (CP) for multiple subsequent NB-synchronization symbols (NB-SS) and having a total duration equal to that of multiple symbol durations.

30. The method of any other example, in which the PSS includes a length-62 Zadoff-Chu sequence provided over seven symbols according to a normal cyclic prefix (CP) configuration or over six symbols according to an extended CP and puncturing configuration.

31. The method of any other example, in which the PSS includes a truncated length-10 Zadoff-Chu sequence or cyclic extended length-12 sequence repeated over multiple symbols according to a repetition pattern.

32. The method of any other example, in which the PSS includes a truncated length-10 Zadoff-Chu sequence or cyclic extended length-12 sequence repeated over multiple symbols according to a spreading code.

33. The method of any other example, in which the PSS includes a member of a set of a truncated length-10 Zadoff-Chu sequence or cyclic extended length-12 sequence provided over multiple symbols, each member of the set being generated from a different root index under a pre-defined root index pattern.

34. The method of any other example, in which the PSS includes a member of a set of a length-15 m-sequence spread over multiple symbols according to a spreading code.

35. The method of any other example, in which the PSS is truncated to a length-10 sequence or a cyclic extended length-12 sequence based on a length-11 or length-seven barker code.

36. The method of any other example, in which the SSS includes two interleaved and scrambled length-31 m-sequences, and the method further comprising receiving the SSS twice each radio frame.

37. The method of any other example, in which the SSS includes two length-31 m-sequences without interleaving and scrambling.

38. The method of any other example, in which the SSS includes a member of a set of a punctured pseudorandom number (PN) sequence spread over multiple symbols based on a spreading code.

39. The method of any other example 8, further comprising determining a frame boundary based on detection of the spreading code.

40. The method of any other example, in which the PSS and SSS are transmitted once, twice, or four times in a radio frame, the method further comprising identifying a frame boundary by successful detection of the SSS.

41. An apparatus of a user equipment (UE) for achieving synchronization in a narrowband (NB) wireless system, the apparatus comprising circuitry configured to receive, within one or more subframes of an NB-long term evolution (LTE) system having an NB-LTE downlink bandwidth comprised of 12 subcarriers at 15 kilohertz (kHz) subcarrier spacing, a primary synchronization signal (PSS) and a secondary synchronization signal (SSS).

42. The apparatus of any other example, in which the circuitry is further configured to receive, according to a time-division multiplexing (TDM) of the downlink transmission, an NB-physical synchronization channel (PSCH) during a first TDM portion of a downlink transmission and one or more other downlink channels during a second TDM portion of the downlink transmission.

43. The apparatus of any other example, in which the PSS and SSS are mapped onto a central set subcarriers of the 12 subcarriers at a sampling rate of 160 kHz or 320 kHz.

44. The apparatus of any other example, in which the PSS and SSS are located in a synchronization block of a single subframe having consecutive first and second slots, the synchronization block spanning a last two symbols of the first slot and a first six symbols of the second slot.

45. The apparatus of any other example, in which the PSS and SSS are located in a synchronization block of a subframe, the synchronization block including a last two symbols of each slot in the subframe.

46. The apparatus of any other example, in which the PSS is located in a first portion of symbols of the synchronization block and the SSS is located in a second portion of symbols of the synchronization block that is different from the first portion of symbols.

47. The apparatus of any other example, in which the PSS and SSS are interleaved in a time domain among symbols of an NB-physical synchronization channel (PSCH) to facilitate coherent detection of the SSS.

48. The apparatus of any other example, in which the SSS is located between multiple PSS transmissions to facilitate coherent detection.

49. The apparatus of any other example, in which the PSS and/or the SSS includes a synchronization signal sequence having a single cyclic prefix (CP) for multiple subsequent NB-synchronization symbols (NB-SS) and having a total duration equal to that of multiple symbol durations.

50. The apparatus of any other example, in which the PSS includes a length-62 Zadoff-Chu sequence provided over seven symbols according to a normal cyclic prefix (CP) configuration or over six symbols according to an extended CP and puncturing configuration.

51. The apparatus of any other example, in which the PSS includes a truncated length-10 Zadoff-Chu sequence or cyclic extended length-12 sequence repeated over multiple symbols according to a repetition pattern.

52. The apparatus of any other example, in which the PSS includes a truncated length-10 Zadoff-Chu sequence or cyclic extended length-12 sequence repeated over multiple symbols according to a spreading code.

53. The apparatus of any other example, in which the PSS includes a truncated length-10 Zadoff-Chu sequence or cyclic extended length-12 sequence provided over multiple symbols, each sequence generated from a different root index under a pre-defined root index pattern.

54. The apparatus of any other example, in which the PSS includes a length-15 m-sequence spread over multiple symbols according to a spreading code.

55. The apparatus of any other example, in which the PSS is truncated to a length-10 sequence or a cyclic extended length-12 sequence based on a length-11 or length-seven barker code.

56. The apparatus of any other example, in which the SSS includes two interleaved and scrambled length-31 m-sequences, and the circuitry is configured to receive the SSS twice each radio frame.

57. The apparatus of any other example, in which the SSS includes two length-31 m-sequences without interleaving and scrambling.

58. The apparatus of any other example, in which the SSS includes a punctured pseudorandom number (PN) sequence spread over multiple symbols based on a spreading code.

59. The apparatus of any other example, in which the UE is configured to determine a frame boundary based on detection of the spreading code.

60. The apparatus of any other example, in which the PSS and SSS are transmitted once, twice, or four times in a radio frame, and the UE is configured to identify a frame boundary by successful detection of the SSS.

61. A method performed by a user equipment (UE) for achieving synchronization in a narrowband (NB) wireless system, the method comprising receiving, within one or more subframes of an NB-long term evolution (LTE) system having an NB-LTE downlink bandwidth comprised of 12 subcarriers at 15 kilohertz (kHz) subcarrier spacing, a primary synchronization signal (PSS) and a secondary synchronization signal (SSS).

62. The method of any other example, further comprising receiving, according to a time-division multiplexing (TDM) of the downlink transmission, an NB-physical synchronization channel (PSCH) during a first TDM portion of a downlink transmission and one or more other downlink channels during a second TDM portion of the downlink transmission.

63. The method of any other example, in which the PSS and SSS are mapped onto a central set subcarriers of the 12 subcarriers at a sampling rate of 160 kHz or 320 kHz.

64. The method of any other example, in which the PSS and SSS are interleaved in a time domain among symbols of an NB-physical synchronization channel (PSCH) to facilitate coherent detection of the SSS.

65. The method of any other example, in which the PSS and/or the SSS includes a synchronization signal sequence having a single cyclic prefix (CP) for multiple subsequent NB-synchronization symbols (NB-SS) and having a total duration equal to that of multiple symbol durations.

66. The method of any other example, in which the PSS includes a truncated length-10 Zadoff-Chu sequence or cyclic extended length-12 sequence provided over multiple symbols, each sequence being generated from a different root index under a pre-defined root index pattern.

67. The method of any other example, in which the PSS includes a length-15 m-sequence spread over multiple symbols according to a spreading code.

68. The method of any other example, in which the SSS includes two interleaved and scrambled length-31 m-sequences, the method further comprising receiving the SSS twice each radio frame.

69. The method of any other example, in which the SSS includes a punctured pseudorandom number (PN) sequence spread over multiple symbols based on a spreading code.

70. The method of any other example, further comprising determining a frame boundary based on detection of the spreading code.

71. An apparatus of a user equipment (UE) for cellular communication with an internet of things (IoT) system, the apparatus comprising: circuitry to receive synchronization signals comprising a primary synchronization signal (PSS) and a secondary synchronization signal (SSS), the synchronization signals being received in one or more subframes of one millisecond duration and through a system downlink bandwidth of less than 180 kHz allocated to multiple subcarriers mutually spaced apart by 15 kHz; and a controller configured to decode the synchronization signal to acquire synchronization.

72. An apparatus comprising means to perform one or more elements of a method described in or related to any enumerated examples, and/or any other method or process described herein.

73. One or more non-transitory (or transitory) computer-readable media comprising instructions to cause an electronic device, upon execution of the instructions by one or more processors of the electronic device, to perform one or more elements of a method described in or related to any enumerated examples, and/or any other method or process described herein.

74. An apparatus comprising control logic, transmit logic, and/or receive logic to perform one or more elements of a method described in or related to any of enumerated examples, and/or any other method or process described herein.

75. A method of communicating in a wireless network as shown and described herein.

76. A system for providing wireless communication as shown and described herein.

77. A device for providing wireless communication as shown and described herein.

Some of the infrastructure that can be used with embodiments disclosed herein is already available, such as general-purpose computers, mobile phones, computer programming tools and techniques, digital storage media, and communications networks. A computing device may include a processor such as a microprocessor, microcontroller, logic circuitry, or the like. The computing device may include a computer-readable storage device such as non-volatile memory, static random access memory (RAM), dynamic RAM, read-only memory (ROM), disk, tape, magnetic memory, optical memory, flash memory, or another computer-readable storage medium.

Various aspects of certain embodiments may be implemented using hardware, software, firmware, or a combination thereof. A component or module may refer to, be part of, or include an application specific integrated circuit (ASIC), an electronic circuit, a processor (shared, dedicated, or group), and/or memory (shared, dedicated, or group) that executes one or more software or firmware programs, a combinational logic circuit, and/or other suitable components that provide the described functionality. As used herein, a software module or component may include any type of computer instruction or computer executable code located within or on a non-transitory computer-readable storage medium. A software module or component may, for instance, comprise one or more physical or logical blocks of computer instructions, which may be organized as a routine, program, object, component, data structure, etc., which performs one or more tasks or implements particular abstract data types.

In certain embodiments, a particular software module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media. Some embodiments may be practiced in a distributed computing environment where tasks are performed by a remote processing device linked through a communications network.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Skilled persons will recognize that many changes may be made to the details of the above-described embodiments without departing from the underlying principles of the invention. For example, while various components have been described above for the synchronization channel structure in a narrowband system and the corresponding signal sequence design—and, depending on specific scenarios, certain combinations of the listed options are viable designs—some designs are more tailored as solutions for typical massive MTC use cases. The scope of the present invention should, therefore, be determined only by claims.

The invention claimed is:

1. An apparatus for a radio access network (RAN) node, comprising:
   a memory interface configured to receive information by which to define a Zadoff-Chu sequence of length 11 frequency-domain elements and a cover code for the Zadoff-Chu sequence for at least four time-domain symbols, in which the Zadoff-Chu sequence includes a root index, the root index having a value in a range between zero and nine,
   wherein the cover code includes a cover code sequence of +1 and 1 values, wherein the cover code sequence of +1 and 1 values corresponds to different time-domain symbols, and in which at least some adjacent values of the cover code sequence each correspond to a −1 value, and wherein the cover code sequence is of length 11 and ends in 1, 1, −1, 1; and a processor configured to generate a narrowband primary synchronization signal (NPSS) based on the Zadoff-Chu sequence and the cover code applied to the Zadoff-Chu sequence.

2. The apparatus of claim 1, in which the cover code sequence of +1 and −1 values corresponds to different time-domain symbols, and in which at least some adjacent ones of the different time-domain symbols each correspond to a +1 value of the cover code sequence.

3. The apparatus of claim 1, in which the value is five.

4. The apparatus of claim 1, in which the NPSS comprises 12 or fewer subcarriers.

5. The apparatus of claim 1, in which the NPSS comprises 16 or fewer symbols.

6. The apparatus of claim 1, further comprising a transmitter to transmit the NPSS for a user equipment (UE).

7. An apparatus for a user equipment (UE), comprising:
a memory interface configured to receive a narrowband primary synchronization signal (NPSS), the NPSS being generated from a Zadoff-Chu sequence of length 11 frequency-domain elements and a cover code applied to the Zadoff-Chu sequence for at least four time-domain symbols, in which the Zadoff-Chu sequence includes a root index, the root index having a value in a range between zero and nine,
wherein the cover code includes a cover code sequence of +1 and −1 values, wherein the cover code sequence of +1 and −1 values corresponds to different time-domain symbols, and in which at least some adjacent values of the cover code sequence each correspond to a −1 value, and wherein the cover code sequence is of length 11 and ends in 1, 1, −1, 1; and
a processor configured to process the NPSS so as to obtain time and frequency synchronization in a narrowband system.

8. The apparatus of claim 7, in which the cover code sequence of +1 and −1 values corresponds to different time-domain symbols, and in which at least some adjacent ones of the different time-domain symbols each correspond to a +1 value of the cover code sequence.

9. The apparatus of claim 7, in which the value is five.

10. The apparatus of claim 7, in which the NPSS comprises 12 or fewer subcarriers.

11. The apparatus of claim 7, in which the NPSS comprises 16 or fewer symbols.

12. A non-transitory computer readable medium for a user equipment (UE), the non-transitory computer readable medium including instructions that, when executed by a processor, cause the UE to:
receive a narrowband primary synchronization signal (NPSS), the NPSS being generated from a Zadoff-Chu sequence of length 11 frequency-domain elements and a cover code applied to the Zadoff-Chu sequence for at least four time-domain symbols, in which the Zadoff-Chu sequence includes a root index, the root index having a value in a range between zero and nine,
wherein the cover code includes a cover code sequence of +1 and −1 values, wherein the cover code sequence of +1 and −1 values corresponds to different time-domain symbols, and in which at least some adjacent values of the cover code sequence each correspond to a −1 value, and wherein the cover code sequence is of length 11 and ends in 1, 1, −1, 1; and
decode the NPSS so as to obtain time and frequency synchronization in a narrowband system.

13. The non-transitory computer readable medium of claim 12, in which the cover code sequence of +1 and −1 values corresponds to different time-domain symbols, and in which at least some adjacent ones of the different time-domain symbols each correspond to a +1 value of the cover code sequence.

14. The non-transitory computer readable medium of claim 12, in which the value is five.

15. The non-transitory computer readable medium of claim 12, in which the NPSS comprises 12 or fewer subcarriers.

16. The non-transitory computer readable medium of claim 12, in which the NPSS comprises 16 or fewer symbols.

* * * * *